United States Patent [19]

Kent

[11] Patent Number: 5,650,995
[45] Date of Patent: Jul. 22, 1997

[54] CONSOLE DISPATCH IN AN EXTENDED MULTISITE RADIO COMMUNICATIONS NETWORK

[75] Inventor: James S. Kent, Lynchburg, Va.

[73] Assignee: Ericsson Inc., Research Triangle Park, N.C.

[21] Appl. No.: 701,911

[22] Filed: Sep. 9, 1996

Related U.S. Application Data

[63] Continuation of Ser. No. 413,873, Mar. 29, 1995, abandoned.

[51] Int. Cl.⁶ .............................. H04Q 7/28; H04B 7/204
[52] U.S. Cl. ....................... 455/508; 455/520; 370/327
[58] Field of Search .................. 370/95.3, 58.3, 370/58.2, 62; 379/229, 310; 455/33.2, 9, 53.1, 58.1, 67.1, 14, 15, 17, 34.1; 340/825.47, 825.52

[56] References Cited

U.S. PATENT DOCUMENTS

| | | | |
|---|---|---|---|
| 4,835,731 | 5/1989 | Nazarenko et al. | 379/63 |
| 4,903,321 | 2/1990 | Hall et al. | 455/34 |
| 4,905,302 | 2/1990 | Childress et al. | 455/34 |
| 5,200,954 | 4/1993 | Teel, Jr. et al. | 370/94.1 |
| 5,253,253 | 10/1993 | Brame et al. | 370/85.11 |
| 5,365,512 | 11/1994 | Combs et al. | 370/16 |
| 5,365,590 | 11/1994 | Brame | 380/49 |
| 5,387,905 | 2/1995 | Grube et al. | 340/825.52 |
| 5,440,759 | 8/1995 | Barnes et al. | 455/15 |
| 5,475,683 | 12/1995 | Harrison et al. | 370/68.1 |

FOREIGN PATENT DOCUMENTS

| | | |
|---|---|---|
| 0 473 355 A2 | 3/1992 | European Pat. Off. . |
| 0549054 | 6/1993 | France . |
| WO9315565 | 8/1993 | Sweden . |
| 2284326 | 5/1995 | United Kingdom . |

*Primary Examiner*—Douglas W. Olms
*Assistant Examiner*—Matthew C. Phillips
*Attorney, Agent, or Firm*—Nixon & Vanderhye

[57] ABSTRACT

In an extended overall radio communications network, one or more dedicated Network Interface Modules (NIMs) are provided in each multisite trunked communications systems to permit the interconnection and communication between plural, multisite systems. A remote multisite system appears through the local NIM as just another site interface to the local multisite system. Basic and advanced dispatch console functions are effected over the extended network via the NIMs in a manner that is transparent to the console operator.

21 Claims, 14 Drawing Sheets

MULTI-SITE ARCHITECTURE

CONSOLE DISPATCH IN AN EXTENDED MULTISITE RADIO COMMUNICATIONS NETWORK

This is a continuation of application Ser. No. 08/413,873, filed Mar. 29, 1995, now abandoned.

FIELD OF THE INVENTION

The present invention generally relates to a distributed control multisite switch architecture which coordinates digitally trunked radio frequency (RF) digital communications over an extended network of multisite RF communications systems, and more particularly, to providing console dispatch features in such an extended radio communications network.

BACKGROUND AND SUMMARY OF THE INVENTION

Trunked RF repeater systems have become a mainstay of modern RF communications systems, and are used, for example, by public service organizations (e.g., governmental entities such as counties, fire departments, police departments, etc.). Such RF repeater systems permit a relatively limited number of RF communications channels to be shared by a large number of users—while providing relative privacy to any particular RF communication (conversation). Typical state-of-the-art RF repeater systems are "digitally trunked" and use digital signals conveyed over the RF channels (in conjunction with digital control elements connected in the system) to accomplish "trunking" (time-sharing) of the limited number of RF channels among a large number of users.

Briefly, such digitally trunked RF communications systems include a "control" RF channel and multiple "working" RF channels. The working channels are used to carry actual communications traffic (e.g., analog FM, digitized voice, digital data, etc.). The RF control channel is used to carry digital control signals between the repeater sites and user RF transceivers (radio units) in the field. When a user's transceiver is not actively engaged in a conversation, it monitors the control channel for "outbound" digital control messages directed to it. User depression of a push-to-talk (PTT) switch results in a digital channel request message requesting a working channel (and specifying one or a group of callees) to be transmitted "inbound" over the RF control channel to the repeater site. The repeater site (and associated trunking system) receives and processes the channel request message.

Assuming a working channel is available, the repeater site generates and transmits a responsive "outbound" channel assignment digital message over the RF control channel. This message temporarily assigns the available working channel for use by the requesting transceiver and other callee transceivers specified by the channel request message. The channel assignment message automatically directs the requesting (calling) transceiver and callee transceivers to the available RF working channel for a communications exchange.

When the communication terminates, the transceivers "release" the temporarily assigned working channel and return to monitoring the RF control channel. The working channel is thus available for reassignment to the same or different user transceivers via further messages conveyed over the RF control channel. An exemplary "single site" trunked RF repeater system is disclosed in commonly-assigned U.S. Pat. Nos. 4,905,302 and 4,903,321.

Single site trunked RF repeater systems may have an effective coverage area of tens of square miles. It is possible to provide one or more satellite receiving stations (and a single high power transmitting site) if a somewhat larger coverage area is desired. However, some governmental entities and other public service trunking system users may require an RF communications coverage area of hundreds of square miles. In order to provide such very large coverage areas, it is necessary to provide multiple RF repeater sites and to automatically coordinate all sites so that a radio transceiver located anywhere in the system coverage area may efficiently communicate in a trunked manner with other radio transceivers located anywhere in the system coverage area.

FIG. 1 is a schematic diagram of a simplified exemplary multiple-site trunked radio repeater system having three radio repeater (transmitting/receiving) sites S1, S2, and S3 providing communications to geographic areas A1, A2, and A3, respectively. Mobile or portable transceivers within area A1 transmit signals to and receive signals from site S1; transceivers within area A2 transmit signals to and receive signals transmitted by site S2; and transceivers within area A3 transmit signals to and receive signals transmitted by site S3. Each repeater site S1, S2, S3 includes a set of repeating transceivers operating on a control channel and plural RF working channels. Each site may typically have a central site controller (e.g., a digital computer) that acts as a central point for communications in the site, and is capable of functioning relatively autonomously if all participants of a call are located within its associated coverage area.

However, to enable communications from one area to another a switching network, as for example the assignee's "multisite switch" described herein, must be provided to establish audio and control signal pathways between repeaters of different sites. Moreover, such pathways must be set up at the beginning of each call and taken down at the end of each call. For example, the site controller (S1) receives a call from a mobile radio in A1 requesting a channel to communicate with a specific callee. A caller requests a channel simply by pressing the push-to-talk (PTT) button on his microphone. This informs the site controller S1 via an "inbound" digital control message transmitted over the RF control channel that a working or audio channel is requested. The site controller assigns a channel to the call and instructs the caller's radio unit to switch from the control channel to the audio channel assigned to the call. This assigned channel is applicable only within the area covered by the site.

In addition, the site controller sends the channel assignment to the multisite switch (200) which assigns an internal audio slot to the call. The multisite switch also sends a channel request over a control messaging bus to other site controllers having a designated callee within their site area. Audio signals are routed such that audio pathways are created to serve the callee(s) and one or more dispatcher consoles 202 involved in the communication. Upon receiving a channel request, these "secondary" site controllers (in the sense they did not originate the call) assign an RF working channel to the call. Each secondary channel is operative only in the area covered by the secondary site controller. The secondary site controller(s) also sends the channel assignment back up to the multisite switch.

Thus, the caller communicates with a unit or group in another area via the multisite switch. The call is initially transmitted to the primary site controller, routed through an assigned audio slot in the switch, and retransmitted by the secondary sites on various assigned channels in those other areas. When the call ends, the primary site controller deactivates the assigned channel for that site and notifies multisite switch 200 that the call is terminated. The multisite switch propagates an end of call command ("channel drop") to all other site controllers. This releases all working channels assigned to the call and breaks the associated audio routing pathways.

In addition to providing communications between mobile radio units in different areas, multisite switch 200 provides communications between land-line telephone subscribers and radio units as well as dispatchers and mobile radio units. Land-line telephone subscribers can communicate with radio units by dialing an access number as well as a radio unit (or group) identification number which is routed to the trunked communications system through a central telephone interconnect switch (CTIS) 212 and multisite switch 200. One or more dispatch consoles 202 is connected to the multisite switch in the same manner as the site controllers 102. Both land-line subscribers and dispatch console operators can issue a channel call request through the multisite switch to a site controller 102 to call for example a mobile radio unit.

Each dispatch console 202 may participate in calls in its area. Thus, when a call comes through the multisite switch from another area to a mobile radio, the switch informs the dispatch console 202 of the call in addition to notifying the corresponding site controller 102. The dispatch operator can then listen or participate in the call. Multisite switch 200 also handles calls to groups of mobile units and/or dispatch consoles by ensuring that the site controllers for all of the callees in the group assign a channel to the group call.

The multisite switch has a distributed control architecture. The logical functions and computational workload of the multisite switch are shared by various distributed microprocessor "nodes". Each node is connected either to a site controller 102, dispatch console 202, public and/or private landline telephone exchanges and other components of the particular communications system. Most nodes function as switch interfaces and include, for example, Master Interface Modules (MIMs) for nodes coupled to site controllers and Console Interface Modules (CIMs) for nodes coupled to dispatch consoles. Each interface module is supported by a controller card that utilizes several microprocessors. All of the cards have substantially the same hardware and are interchangeable. Each card acts as a gateway interface into the distributed control switch network.

Detailed description and operation of the multi-site switch, generally, is set forth in commonly assigned U.S. Pat. No. 5,200,954 entitled "Communication Link Between Multisite RF Trunked Network and an Intelligent Dispatcher Console", the disclosure of which is also incorporated herein by reference.

In general, trunked communications systems of the type described above operate independent of one another. Consequently, a user (or "communications unit") located in a first multisite communications system is not generally able to communicate with a second user located in a second multisite communications system. Thus, the overall coverage available to a user is limited to the particular coverage areas of a single multisite communications system. Recently, the assignee of the present invention overcame this limitation by providing fully trunked communication links between one or more multisite systems in a manner that is fast, flexible, compatible with existing multisite switch architecture and essentially transparent to users. In this regard, reference is made to U.S. patent application Ser. No. 08/156,785 filed on Nov. 24, 1993 entitled "Extended Trunked RF Communications System Networking," the disclosure of which is incorporated by reference.

More specifically, a dedicated Network Interface Module (NIM) provided in the multisite switch permits the interconnection and communication between multiple multisite switch controlled networks to create an extended overall communications network. The Network Interface Module allows a remote multisite switch controlled network to appear as just another node to the local multisite switch. Each network can then communicate over this common "node" interface permitting internetwork communication that is predominantly transparent to a network user. Moreover, using a plurality of network interface modules per switch, the overall communications network can be much extended by connecting individual multisite switch controlled networks together, for example, in series, "star" or multiple "star" configurations.

While single multisite systems provide console dispatch operations, console dispatch operations are not available in an extended multisite network. As a result, even though a local console in a local multisite network is programmed to monitor calls for a particular radio talk group, the local console is not able to perform basic and advanced console functions with radios in that talk group located in a remote multisite network. Instead, the console calls can only be handled like a typical radio call. For example, a console operator in an extended multisite network cannot select several talk groups and/or conventional (nontrunked) radio channels and patch them together as a single talk group over the extended network. In another example, a console dispatcher in a single multisite system may select several different entities including talk groups, individual radios, conventional radio channels, and/or wireline telephone numbers and communicate with them simultaneously, i.e., a "simulselect" feature. Like the extended multisite patch function, a console cannot perform a simulselect function outside of its local multisite network.

In addition, the present invention provides various console functions like "patch" and "simulselect" in an extended multisite RF trunked communications network in a fashion that is transparent to the console dispatcher. As a result, basic and advanced console dispatch functions may be performed by an operator in essentially the same fashion that those functions are performed in a single multisite radio communication system.

For example, when a local dispatch console requests a patch operation providing a list of specific entities to be patched at one of plural multisite systems, an available system assigned ID is selected and assigned to that patch list. The network interface module (NIM) local to that multisite system buffers the patch activation and transmits only those patches/simulselects that contain entities enabled for extended network communication. Accordingly, the local NIM does not interfere with the existing single multisite patch functionality. In addition, various entity IDs that are not enabled over the extended network may be reused in each individual multisite system.

The local NIM sends the patch message over a control link connecting a local multisite system with a remote multisite system where it is received by another network interface module (NIM) at the remote multisite, i.e., the remote NIM. Those entities at the remote multisite are programmed to the patch system assigned ID so that when a console dispatcher begins a substantive message from the local dispatch console, all entities in the local and remote multisites programmed with the corresponding patch ID will receive and can participate in the group communication set up by the dispatch console operator.

A state machine architecture is provided to implement console functions such as patch and simulselect over the extended multisite network. A timer is set for each state in the state machine to ensure smooth state transitions. Whenever a console operation does not proceed to the next expected state within the state timer interval, that operation is aborted. This is particularly advantageous in an extended multisite network where there are many different potential pit falls for a console function like a patch. The time limited state machine architecture helps ensure that all parts of the extended network affected by the console operation remain synchronized.

Current extended multisite networks also do not track which dispatch consoles in each multisite system are programmed to monitor specific entities, e.g., talk groups, conventional channels, etc., over the extended network. Even though a console remains in a constant location or "console position" (unlike portable radios), each console may monitor more than a hundred callees at one time over the extended network. Since many consoles throughout the different multisite networks may have the same callee selected/programmed, the problem is one of keeping track of the programmed state of each callee at each console over the extended network. This tracking problem is particularly complicated during dispatch operator shift changes, for example, where the programmed status of many callees may change in a very short time interval as new console dispatch operators log in with different programmed callee setups. Although one possible way of dealing with the tracking dilemma is to force all calls to any node that has a console to ensure that the console can monitor any of the calls, this method is inefficient because many calls which are not being monitored are nonetheless routed to that node.

In contrast, the present invention provides a console tracking procedure that allows more efficient use of the network channels in a system with consoles installed on multiple nodes. Calls are efficiently routed to remote multisite systems when the called entity (the "callee") is programmed by at least one console at the remote multisite system. Otherwise, calls are not routed to remote consoles. Using this technique, the extended network is not forced to route all calls to all consoles in every multisite system. Instead, the present invention only routes a call to multisite systems that have a console programmed to receive that particular call.

A console programmed entity database includes an entry in that database for each possible callee in the system. Each entry includes a count of local consoles at a particular local multisite system that currently have the callee programmed. When a console is programmed to add that callee, the count is incremented by one. Conversely, when a console having that callee programmed is reset or deprograms that particular callee, the count entry is decremented. If the count value for that callee reaches zero, then it is unnecessary for a call involving that callee to be routed to that particular multisite. The database also includes a list of callees currently programmed at each local console. Remote console data is stored for each callee indicating whether the callee is programmed at any console on remote multisite systems. Further tracking information is also stored for large internetworks of multisite systems, i.e., stargate connected multisite systems. Based on the information in this database, the local NIM decides which calls in its own local multisite switch need to be routed (through the local NIM) to consoles at remote multisites.

BRIEF DESCRIPTION OF THE DRAWINGS

These and other features and advantages of the present invention will become more completely understood by referring to the following detailed description of presently preferred exemplary embodiments in conjunction with the FIGURES in which like reference numerals refer to like elements throughout.

DETAILED DESCRIPTION OF THE DRAWINGS

In the following description, for purposes of explanation and not limitation, specific details are set forth, such as particular circuits, circuit components, interfaces, techniques, etc. in order to provide a thorough understanding of the present invention. However, it will be apparent to one skilled in the art that the present invention may be practiced in other embodiments that depart from these specific details. In other instances, detailed descriptions of well known methods and programming procedures, devices, and circuits are omitted so as not to obscure the description of the present invention with unnecessary detail.

Figure 1:
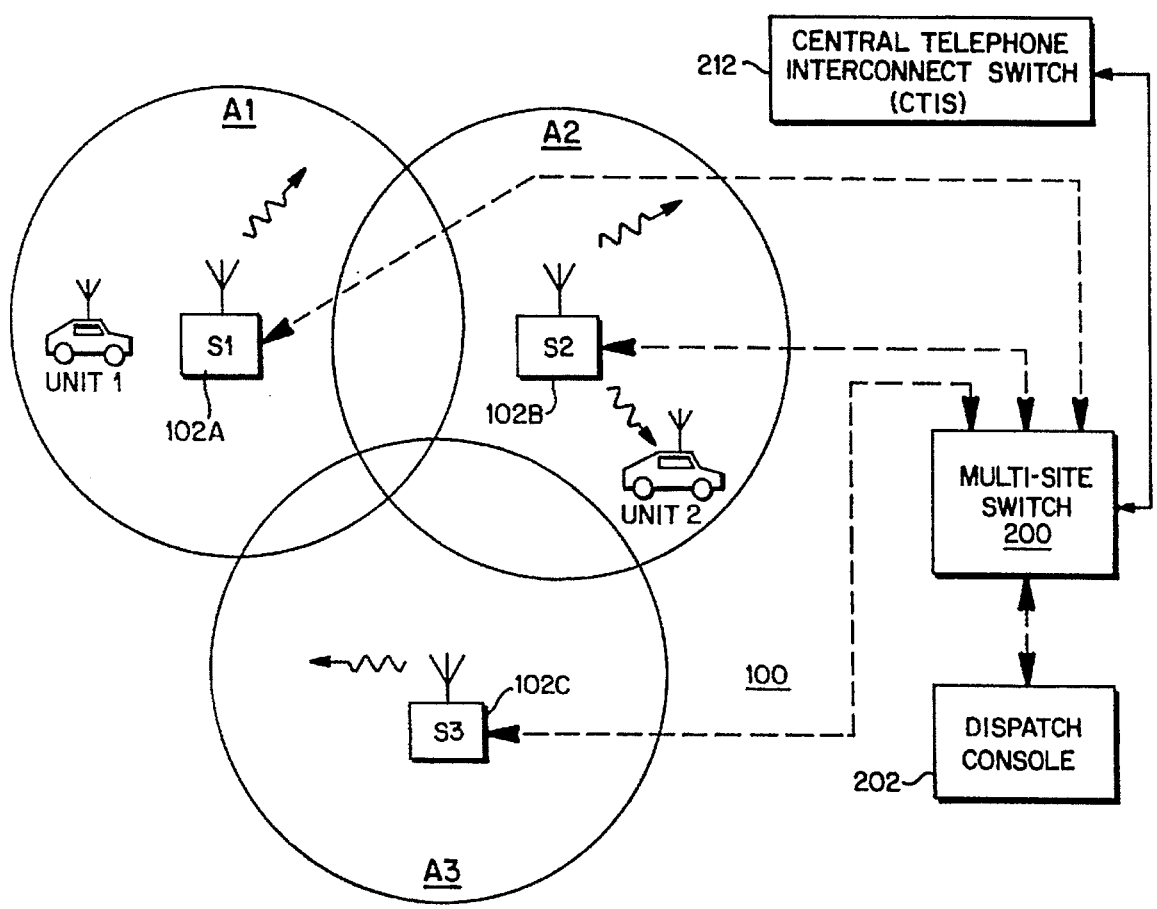
FIG. 1 is a schematic illustration of an exemplary multisite trunked RF communications system.

An exemplary trunked radio repeater system 100 in accordance with the invention is generally depicted and was described above in conjunction with in FIG. 1. In the preferred multisite system 100, for example, the site controller (S1) receives a call from a mobile radio in coverage area A1 requesting a channel to communicate with a specific callee or group of callees. The caller requests the channel simply by pressing the push-to-talk (PTT) button on the microphone of his remote RF transceiver. This informs the site controller (e.g., via an "inbound" digital control message transmitted over the RF control channel) that an audio working channel is needed. The site controller assigns a working channel to the call and instructs the caller's radio unit to switch from the control channel to the assigned working channel. This assigned working channel is thus ready to support communications within the area covered by the site.

In addition, the site controller sends a message indicating the channel assignment to multisite switch 200. The switch, in turn, sends a channel request to all other site controllers and routes audio signals such that an audio signal pathway is created between the RF repeater servicing the caller and the RF repeater(s) servicing the callee(s). Additional audio signal pathways may also be established in similar fashion such that one or more dispatch consoles 202 and land-line subscribers may become involved in the communication. Upon receiving a channel request message, these "secondary" site controllers may each assign an RF working channel to the call (e.g., if a callee designated by the caller's channel request message happens to be physically located within the coverage area serviced by the associated RF transceiving site). Meanwhile, multisite switch 200 ensures that the caller's audio has been routed from the active RF receiver of site S1 to active transmitters of each of the other sites participating in the call.

Figure 2:
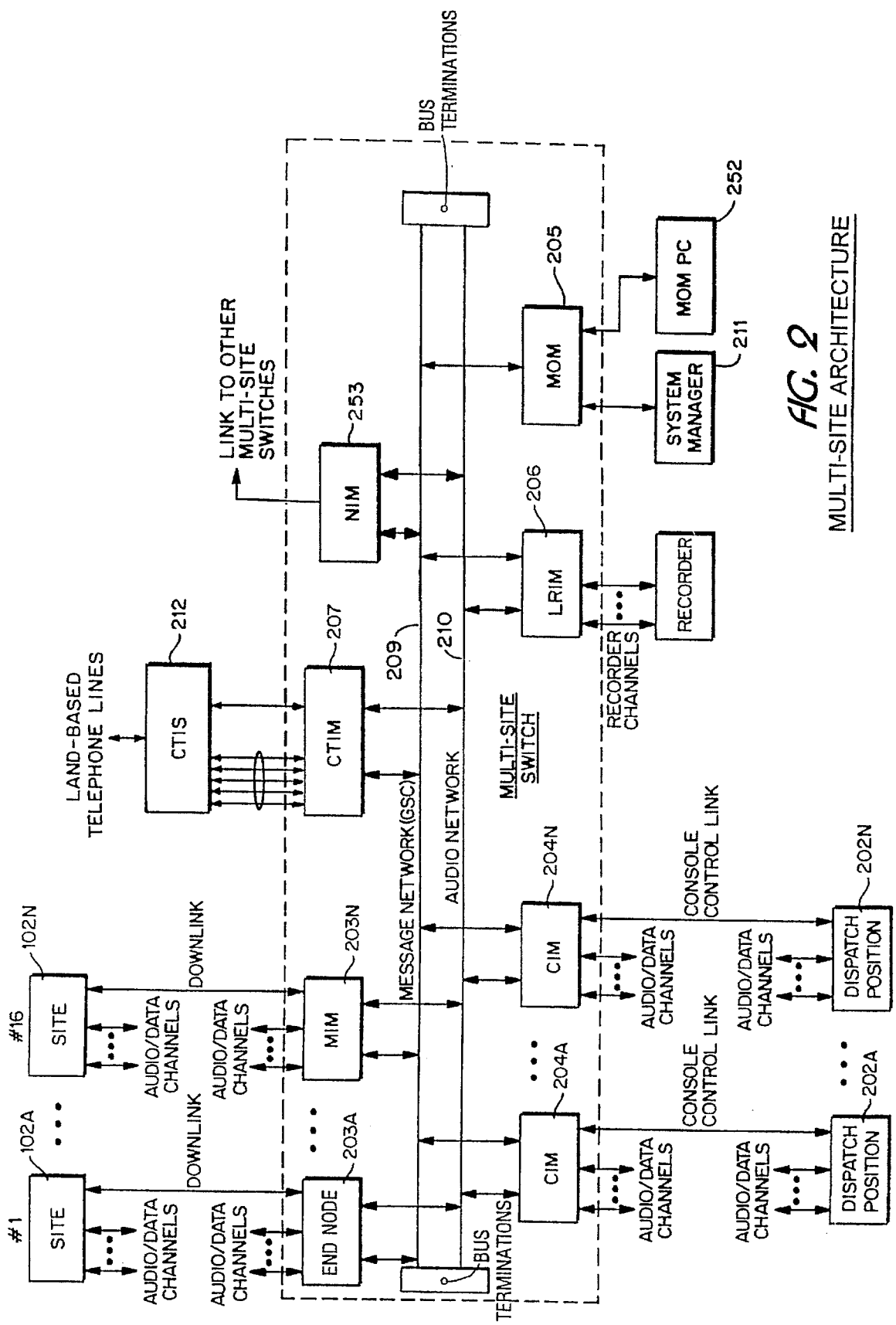
FIG. 2 is a schematic of an exemplary architecture for a distributed, digitally trunked, RF communications multisite switching network.

FIG. 2 is a detailed schematic diagram of the architecture of multisite switch 200 provided by the presently preferred exemplary embodiment of this invention. The multisite switch 200 communicates with each site controller 102 and dispatcher console 202 via data and audio communication lines which may include dedicated land lines or microwave links.

The multisite switch 200 establishes and removes audio connections between sites 102 and dispatch consoles 202 using a local area network of nodes (e.g., MIMs, CIMs, NIMs, CTIM, and MOMs). As shown in FIG. 2, the nodes are labelled corresponding to whether they interface with a site controller, dispatch console, landline telephone switch, another multisite switch or some other system component (or as in the case of MOM 205 perform some other control function). For example, MIMs 203 are interface modules in the switch that interface with site controllers and CIMs 204 are nodes that interface with dispatch consoles. The MOM supervises control communications over the control message bus and interfaces the system manager 211 and the MOM PC (personal computer) 252 that have supervisory responsibility for multisite switch 200 and the overall radio communications system as connected through the switch. The LRIM (206) interfaces recorders to the switch assigned to log calls for various groups or units. The CTIM (207) functions much the same as a MIM with respect to interfacing a site to the multisite switch except that it interfaces to landline telephone lines from Central Telephone Interconnect Switch (CTIS) 212 to switch 200. The Network Interface Module (NIM) interfaces one multisite switch 200 to another multisite switch at another similar radio communications system to provide an even greater coverage area. Using NIM 253, multiple multisite switches can be connected in various configurations to provide a much extended communications network as discussed in greater detail herein below.

Each node in the multisite switch is supported by a microprocessor-based controller module. All of the nodes (the MIMs, CIMs, CTIM, MOM, LRIM, and NIM) have the same hardware and are interchangeable. The nodes have different "personalities" to indicate that they are assigned to, for example, a site controller or a dispatch console, etc. Each node can be easily configured to be a MIM, CIM, etc. by setting a few switches.

As shown in FIG. 2, the nodes of multisite switch 200 are connected into a control message network 209 and a digital audio (TDM) network 210. The control message network is preferably a message network employing a conventional Global Serial Channel (GSC) digital messaging protocol, for example, as implemented using an Intel 80C152 GSC microprocessor. The GSC microprocessor is used as the communications controller in the controller module in each node and is essentially dedicated to performing I/O functions for the node. The control message bus 209 is a high speed data bus that interconnects the communication processors in the controller of each node.

The audio bus 210 comprises up to thirty-two (32) time division multiplexed (TDM) buses in the preferred embodiment. Each bus contains thirty-two (32) slots, each slot corresponding to a single audio channel. Therefore, a maximum of 1024 audio slots may be routed through the multisite switch (i.e., 32 buses×32 slots), although some of the slots are used for other purposes (e.g. signalling). In the presently preferred embodiment, eight (8) buses are provided and only 240 channels of digitized audio are carried by audio TDM network 210.

MOM 205 is the interface module for System Manager 211 and MOM PC (personal computer) 252. The System Manager updates databases maintained in all of the nodes. The MOM 205 maintains certain specialized databases including databases for calls selected by the dispatcher at a dispatch console and activity status of every node in the network. A node's status (e.g., active or inactive) is monitored periodically by the MOM. Polling messages from the MOM addressing specific blocks of nodes are transmitted over control message bus 209. Each node monitors the control message bus to determine if its address falls in the range currently being addressed. If it is, the node responds to the poll by sending a Node Access Message (NAM) over the message bus to the MOM. The MOM then correlates each received NAM with its corresponding node of origin to record its active status in the node activity status data base.

As part of the multisite switch initialization procedure, the nodes connect their assigned TDM bus slots to the node's external channel inputs. For example, a MIM will assign each channel from its site controller to a separate audio TDM bus slot on audio network 210. Once the TDM bus slot is linked to the site channel, the bus slot continuously receives the output from the channel through the host node without requiring further channel setup. Of course, the site channel has no intelligible signal until it is assigned to a call by the site controller. Although a TDM bus slot is linked to a corresponding site channel, no other nodes (each interface module such as MIM, CIM, etc. is a node) listen to that bus slot until the host node initiating a call sends a slot assignment message throughout multisite switch 200 over message network 209 notifying all nodes that an active call from the site is assigned to that bus slot.

Each node includes an interface processor that performs the logical functions for the node (sometimes referred to as an interface module). Interface processor initially assigns TDM bus slots to channels for the individual RF transceivers. The interface processor sets up the connection between a site RF channel or an audio/data channel at a dispatcher console and the audio slots on the multisite switch TDM audio bus to establish a communications link when a call ends. Each call through multisite switch 200 is patched from its assigned TDM bus slot on the audio bus 210. Since the interface processor for each node assigns slots, connects audio slots to the site controller or dispatch console to establish a communications link, and terminates calls, the nodes must continually inform each other of their slot assignments when a call involving that slot becomes active.

Accordingly, the nodes send control messages regarding slot assignments, slot updates, and slot idles over the control message network 209 to other nodes.

Each MIM is coupled to its site controller through a standard serial telephone line or other transmission media. MIMs receive digital command signals from their site controllers 102 through a downlink line as is described in commonly assigned U.S. Pat. No. 4,835,731, entitled "Processor-To-Processor Communications Protocol For A Public Service Trunking System" also incorporated by reference.

Each MIM also maintains a radio unit database that identifies the radio units within its site and the groups that correspond to active calls. These databases are set up by the system manager 211 (FIG. 2) and sent to all interface modules. The radio unit database identifies each radio unit. For each MIM, some of the radios will be in its assigned site area and others will be outside of its area. Each MIM keeps track of which radios are in its area and which talk group(s) is(are) currently selected by the unit. Since each radio may be capable of participating in several different groups, the radio operator selects the desired group at any particular time. Whenever a call comes in for the selected group, then the radio receives the call.

The MIMs also maintain a group database. A group is a collection of units that communicate together on a single call. For example, there may be a group for the fire department that allows all of the fire trucks to listen to the central dispatcher or the fire chief. The dispatcher programs this group into his dispatch console to broadcast messages to all fire trucks. Similarly, groups can be established for rescue stations, police units assigned to a particular precinct, and many other combinations of users of the public service radio system.

When a unit enters a new site area, a log-in message is sent from its new site controller to the corresponding MIM identifying the unit and its currently selected group(s). The MIM receiving the login signal increments the group "count" for the unit's selected group. Similarly, when a unit leaves an area, the corresponding MIM logs the unit out of its group count database by decrementing the count of the unit's current group. In addition, when a unit changes groups, it sends a group login message that causes the MIM for its area to increment the count for the newly selected group and decrement the count of the old group.

The procedures followed by the multisite switch 200 in activating a call from a radio unit and from a dispatcher console, confirming receipt of the call request, and terminating the call are now described. A more detailed description of the messaging and protocols involved in the call setup and takedown procedures is provided in commonly assigned U.S. Pat. No. 5,200,954 entitled "Communication Link Between Multisite RF Trunked Network and an Intelligent Dispatcher Console" referenced above.

More specifically, referring again to FIG. 2, the MIM responds to the site originated TDM bus slot assignment by sending messages on the multisite switch message bus 209. A TDM slot assignment message is sent to all multisite switch components (e.g., interface modules or "nodes") identifying the TDM bus slot on the audio bus 210 that is assigned to the call. Upon receipt of the slot assignment message, each CIM (204) looks through its database to determine if the callee is programmed at its corresponding console 202. If the callee is programmed and the channel assignment message indicates that the audio is not encrypted, CIM 204 connects its corresponding dispatch console 202 to the audio slot for the call. In this way, the dispatch console can monitor all unencrypted calls involving groups or units that have been programmed by the dispatcher. The MOM (205) sets up group calls, informs CIMs of console selected calls, and tracks which calls have been selected by a dispatch console. The secondary MIMs receive a TDM bus slot assignment and a slot update from the primary MIM. Each MIM checks its unit database to determine whether the callee(s) is listed as being in its area. If the callee(s) is not in its area, then the MIM does nothing. If there is a callee(s) in its area, the MIM is designated as a secondary MIM and sets the assigned TDM bus slot bit (or clears the bit if the slot assignment says the channel is dropped) on the bit map maintained in its RAM (312) to stop subsequent updates from being sent to the interface processor (314).

To permit the interconnection and communication between multiple multisite switch controlled systems so as to create an extended overall communications network, one or more dedicated Network Interface Modules (NIMs) are also provided within the multisite switch. The Network Interface Module (253) uses substantially the same hardware used for other nodes, such as a MIM, but is software configured to allow a remote multisite switch controlled network to appear as just another node to the local multisite switch. Each network can then communicate both TDM audio and GSC message information through this common "node" interface resulting in intersystem communication transparent to a network user. Using a plurality of network interface modules per switch, the overall communications network can easily be much extended, for example, by connecting individual multisite switch controlled networks together in a star or series configuration.

Figure 3:
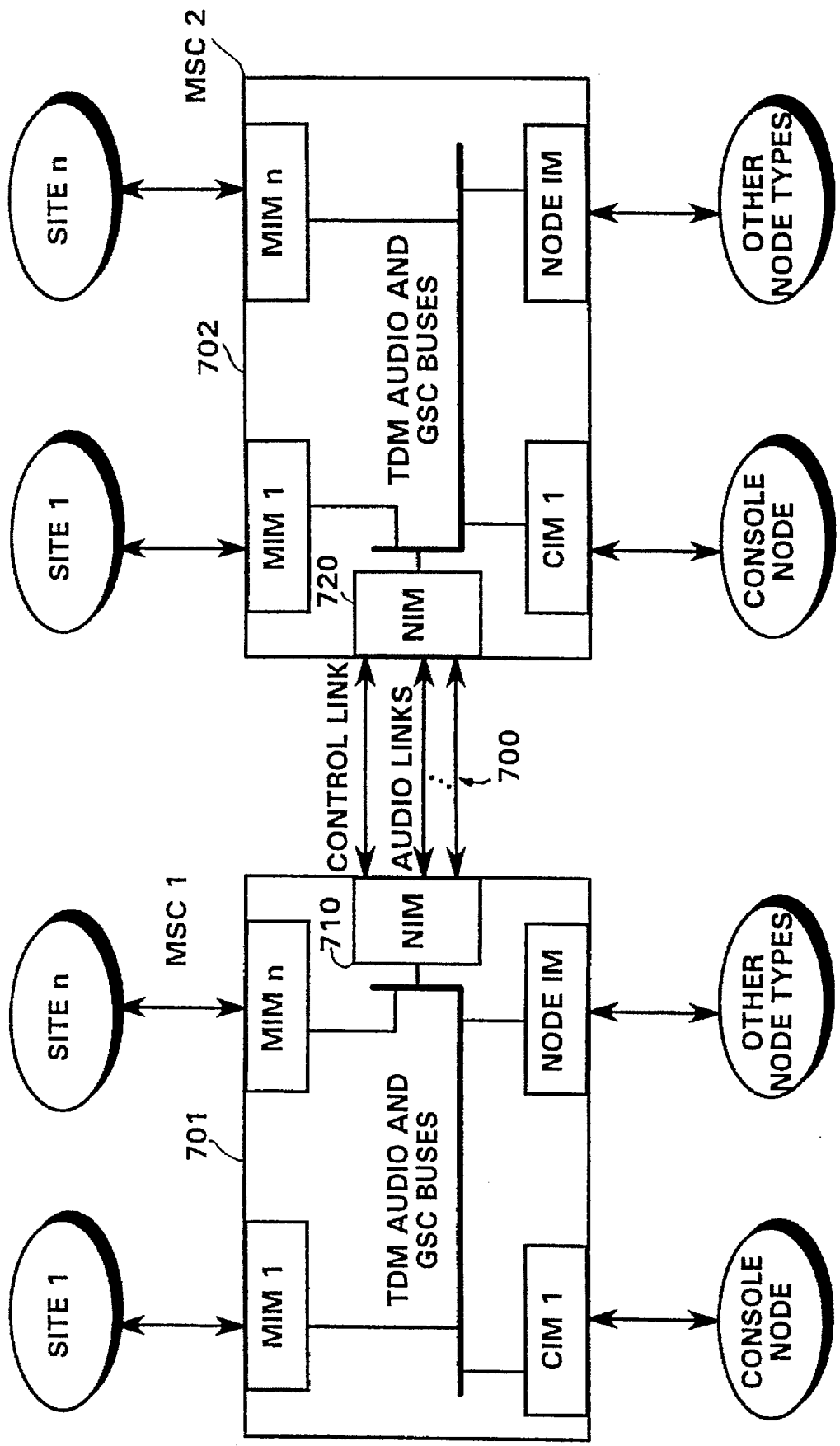
FIG. 3 is a block diagram of a pair of multisite network switches interconnected through a multisite audio and control communication link via a network interface module (NIM)
Figure 4:
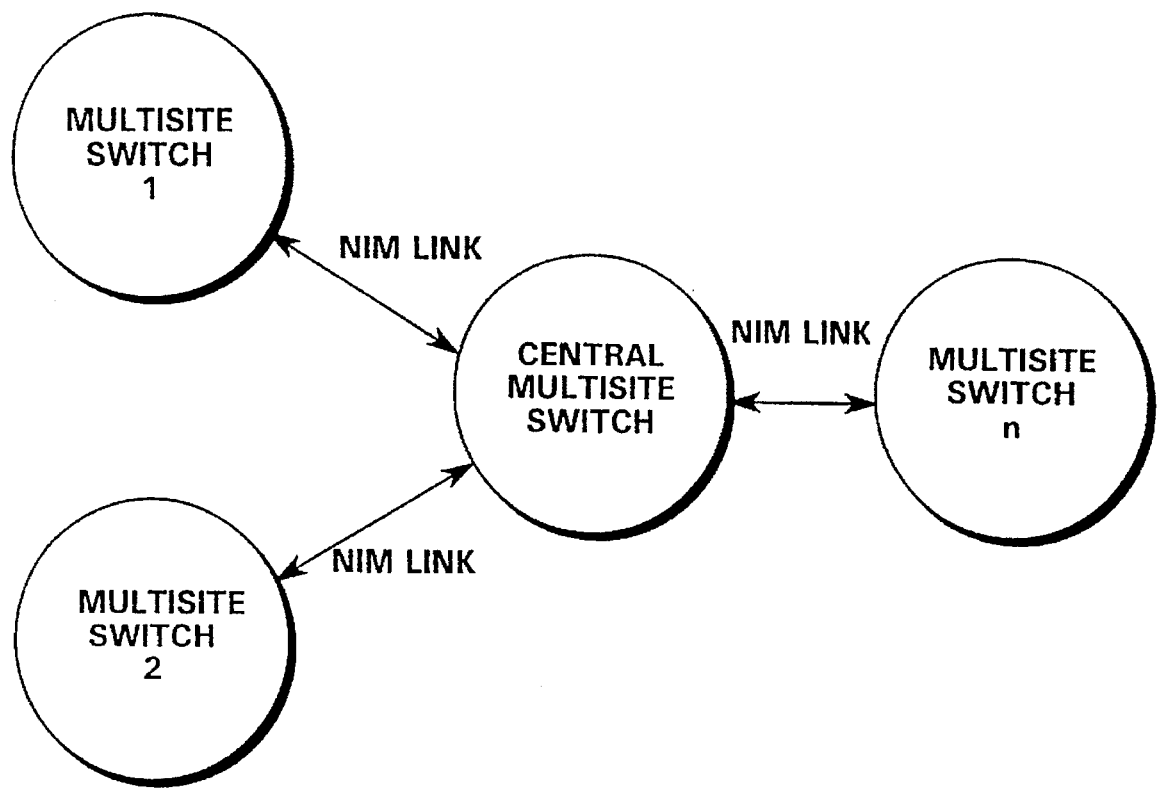
FIG. 4 is a block diagram illustrating a multiple multisite network configuration having the multisite switches of each network linked together by a central multisite network switch that contains multiple NIMs.

Referring now to FIG. 3, an example extended networking arrangement is shown consisting of a pair of multisite network switches (701, 702) interconnected via NIMs (710, 720) through a multisite link (700). For the simple arrangement shown, all that is required is a single multisite link and a single NIM at each multisite switch to control the interface. Multisite link 700 consists of one internetwork control channel and up to twenty (20) internetwork audio channels and may utilize conventional T1 landline or microwave communication links. The NIM essentially performs like a virtual MIM-like site interface between two multisite switches. For a more complex extended network arrangement, multiple NIMs may be utilized at each multisite switch. For example, a "stargate" system arrangement, such as shown in FIG. 4, might consist of more than two multisite switch networks linked together by a central multisite switch network that contains multiple NIMs.

In the preferred exemplary embodiment, the NIM uses an RS232 serial link for the control link, which can configured for 9600 19.2K or 38.4K baud operation. The average control message signalling for a multisite linked call, including call set up and call teardown, requires about fifty (50) bytes (based on the MIM type protocols described in the commonly assigned related applications described above). The NIM assigns audio channels in simplex and will assign an idle audio channel for each call attempt. Such simplex channel selection allows each multisite switch to select from the full set of audio channels independently. In the unlikely event that no idle channel is available, the NIM queues the call in an assignment queue located in an internal nonvolatile RAM memory (possibly resulting in some delay).

The NIM operation supports both transmission trunking and control message trunking using simplex or duplex communications for the audio links. To the originating multisite switch network, the NIM appears as a normal node receiving a call over the TDM audio bus (i.e., a MIM-like trunked site). To the destination multisite switch network, the NIM appears as a normal node (trunked site) originating the call. This fully trunked arrangement provides very fast access times throughout the extended network.

Each NIM controller is software configured for performing all node functions, such as tracking channel assignments, updates and idles of other interface modules of the multisite switch in its corresponding data base, in the same manner as the MIMs and other nodes. In addition, each NIM also tracks radio units between linked multisite networks, monitoring call traffic on the local multisite switch network and routing any calls that have radio units tracked to the remote switch network, selecting an audio channel for all calls routed by the NIM, and broadcasting all calls received from the remote multisite switch network to all sites/consoles on the local multisite switch.

To track radio units between networks, radio unit tracking information is stored in a data base in every NIM controller memory. Each NIM uses the same radio unit tracking data base arrangement as a MIM (or a CIM). However, whenever a local NIM changes an element in its tracking data base, it also sends a control message to the remote NIM to which it is connected so that the remote NIM can update its tracking data base accordingly. Basically, a radio is marked as "on site" at a local NIM (i.e., a software flag is set in tracking data base of the local NIM), only if it is also marked as "on site" at a MIM or NIM located on a remote network to which the local NIM is connected. Likewise, a unit is marked as being "on site" at a remote NIM if the unit is logged as being "on site" by any MIM or other NIM on a local multisite switch network connected to the remote NIM. Consequently, a previous (or original) login site of a radio unit can be tracked back between networks by noting which NIMs have the unit marked as "on site" in their tracking data base.

Figure 5:
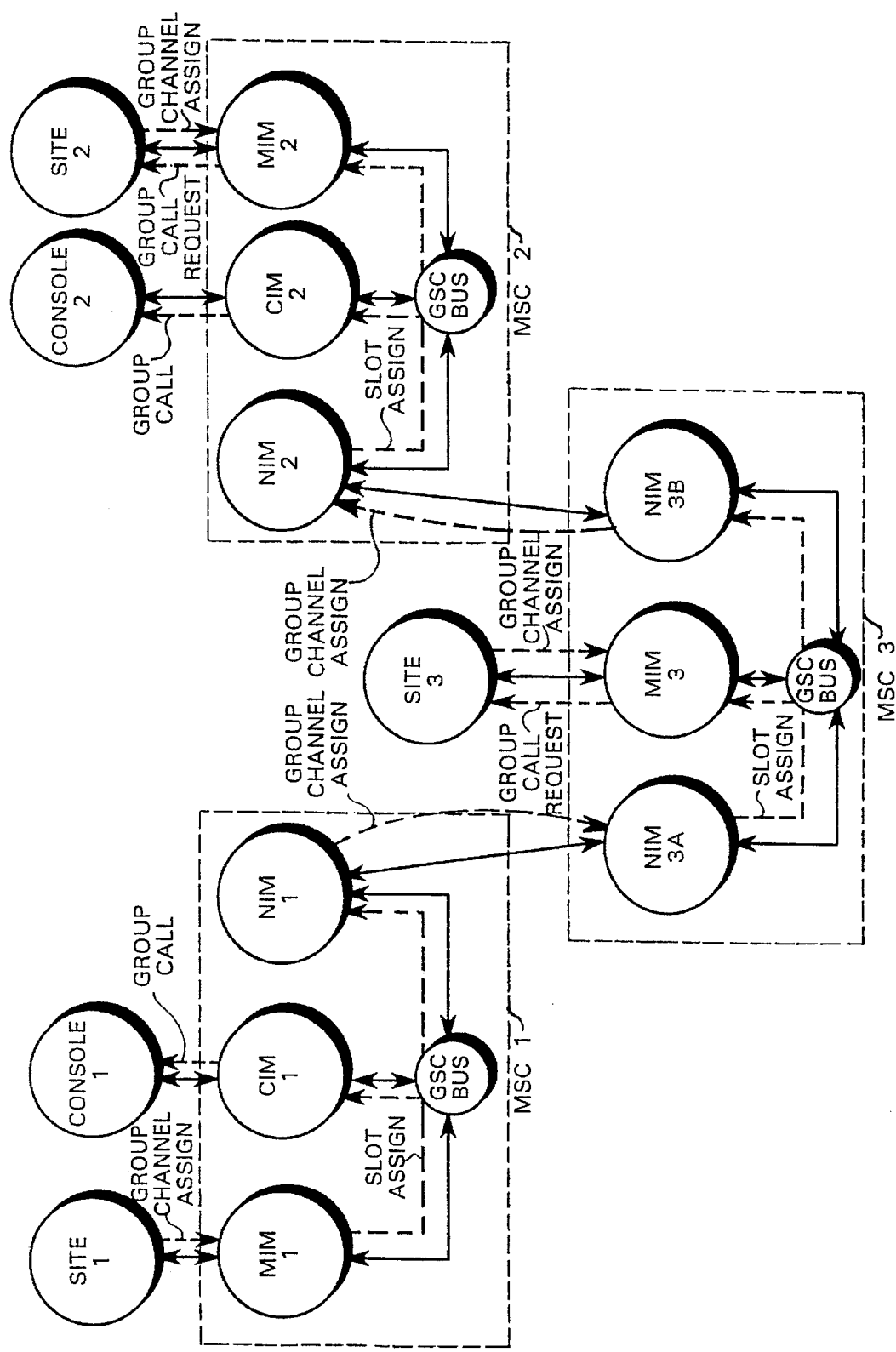
FIG. 5 is a flow diagram illustrating call group information flow between multisite networks which have mobile units tracked for a particular group.

As an example of radio unit call tracking, FIG. 5 illustrates the information flow between NIMs, CIMs and MIMs at multisite networks MCS1–MCS3 for a group call where sites "1", "2" and "3" in different networks have radio units tracked for a particular group.

CONSOLE FEATURES IN AN EXTENDED MULTISITE NETWORK

The present invention provides many multisite console dispatch features over the extended multisite network which are substantially transparent to a console dispatch operator. For purposes of illustration only, however, implementation of two particular console dispatch features—"patch" and "simulselect" is described. Nevertheless, the present invention also encompasses other basic and advanced console dispatch features including, for example, console intercom, supervisor preempt, and console disable features described below.

Briefly, for console preempt, a console has the authority to preempt a radio transmission. All listeners of the original radio transmission hear the preempting console for the duration of the console push-to-talk (PTT) transmission. When the console unkeys by releasing the PTT, listeners again hear the preempted radio if it is still transmitting. On an extended network, a console on any multisite switch, i.e., network "node," preempts a radio transmission from any network node, and all listeners on any node hear the preempting console.

In supervisor preempt, a supervisory console preempts a non-supervisory console while the latter is transmitting. A supervisory console on any network node preempts a non-supervisory console on any network node. All listeners of the non-supervisory console transmission on all network nodes hear the supervisory preempt transmission.

A console intercom call is similar to a telephone call between two console dispatch positions. When a console calls another console, the called console "rings" to inform that console operator of the incoming intercom call. The called operator then must answer the console call before communication proceeds. This allows the called console operator to wait until no critical radio transmissions are being received before accepting the console call. Additionally, a console intercom call supports other telephone call-like features such as placing the caller on hold, and "hands-free" full duplex operation (i.e., no PTT required to talk). In an extended network, a console operator selects consoles on a remote network node as easily as consoles on its own network node for transparent operation of this feature.

In console disable, a supervisory console has the authority to disable a non-supervisory console. A disabled console cannot allow an operator to log-in, and thus cannot perform any dispatch functions i.e., cannot transmit or monitor calls. The supervisory console may also re-enable a console previously disabled. This function allows all consoles that belong to a particular supervisory console to be remotely disabled when they should no longer be used (for example at the end of a shift). The consoles may then be remotely re-enabled at the start of the next shift.

A Patch/Simulselect Example

The console "patch" feature allows a console operator to select several talk groups, conventional radio channels, conventional wireline telephone numbers, and/or other entities and patch them together temporarily as a single talk group. During the patch, radios on separate talk groups can communicate with each other as if they were on the same talk group for the duration of the patch. With the patch activated, communications from the console operator are communicated to all patched entities.

The "simulselect" console feature is similar to the patch feature except that simulselected entities continue to communicate as separate entities. In other words, radios on separate talk groups do not communicate with one another. However, communications from the dispatch console to any of the simulselected entities are received by all simulselected entities.

Figure 6A:
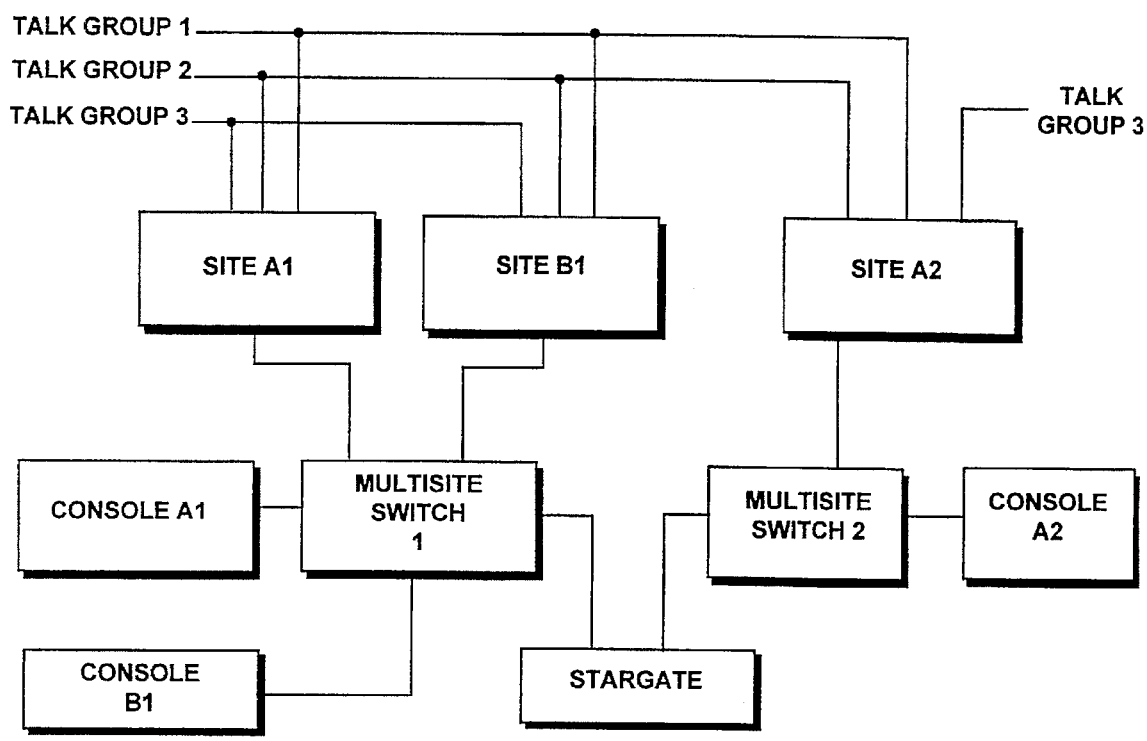
FIGS. 6A and 6B illustrate a patch operation in an extended multisite network in accordance with the present invention.
Figure 6B:
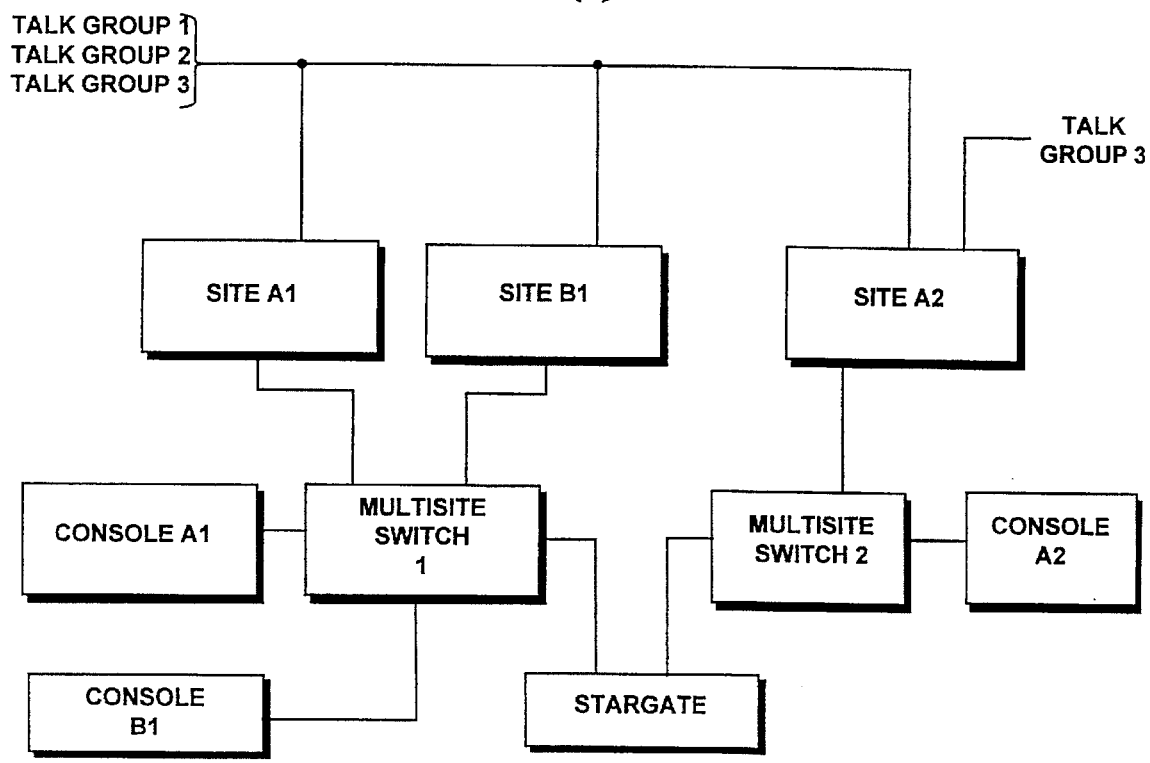

FIGS. 6A and 6B illustrate communication paths for several talk groups before (FIG. 6A) and after (FIG. 6B) an extended network patch in accordance with the present invention. Specifically, FIG. 6A shows that in the multisite system 1 including consoles A1 and B1 are connected to a second multisite system 2 through "stargate" NIM modules. Multisite system 2 includes console A2 and site A2. Radios in talk group 1 can communicate with each other from sites in both multisite systems 1 and 2. Likewise, radios on talk group 2 can communicate with each other from sites in both multisite systems 1 and 2. However, radios on multisite switch 1 on talk group 3 cannot communicate with radios in talk group 3 on multisite system 2.

Turning to FIG. 6B, a console dispatch operator at console A1 in multisite system 1 constructs a "patch" that permits group communication by radios on talk groups 1 and 2 on both multisite systems 1 and 2 and radios on talk group 3 on multisite system 1. Talk group 3 on multisite system 2 remains independent. Accordingly, a radio in either multisite system 1 or 2 belonging to talk group 2 can communicate with radios in talk group 1 at either multisite system 1 or 2 and radios in talk group 3 at multisite system 1. Moreover, console A1 receives communications from and sends communications to all radios in the patched talk groups. However, communications from radios in talk group 3 in multisite system 2 are not received by the patched radios or the consoles at multisite switch 1.

The NIM in each multisite system passes patch/simulselect messages across the control link to remote NIMs either associated with the stargate link or directly with another remote multisite system. When a patch/simulselect is being set up at a console at a "local" multisite, the local NIM stores all extended network enabled entities in the patch. In other words, the local NIM filters from the patch or simulselect activate command remote entities which are not enabled for extended network communications. If the patch includes remote entities, only enabled remote entities participate in the patch. Therefore, if no remote entities to be patched are enabled, the NIM will not send a patch/simulselect build command to a remote NIM. Otherwise, the NIM generates patch/simulselect messages containing only those remote enabled entities for communication with the remote NIM.

Each multisite system is assigned a unique pool of system assigned identifications (SAIDs) from the system manager for use in patch/simulselect activations from that multisite system. A local console requests a free SAID from the local MOM at the time that a patch/simulselect operation is activated. The local MOM then selects and assigns an available SAID to that patch/simulselect.

Thus, one particular advantage of the present invention is that the local NIM buffers all patch/simulselect activations on the local multisite system and transmits only those patches/simulselects that contain entities enabled for extended network communication. This minimizes interference with existing single multisite patch functionality. Another advantage is that the non-enabled entity IDs can be reused at other multisite systems. In other words, a patch involving a nonenabled ID only affects the corresponding entity on the local multisite switch but does not affect a similarly identified entity on a remote multisite switch.

Each NIM stores a patch/simulselect (PSS) database for its local multisite system. Initially, the NIM detects a patch/simulselect command on the multisite control bus, filters the list of entities to be patched, and stores any extended network enabled entities from the list. If any extended network enabled entities are found, the NIM constructs HEADER, COLLECTION, and ACTIVATE messages. The local NIM PSS database includes an entry for each console on the local multisite system. Thus, if the multisite system has 32 consoles, the NIM PSS database has 32 entries for monitoring those 32 consoles simultaneously. In essence, the PSS database is the mechanism by which the NIM keeps track of the activation/deactivation of patch/simulselect operations. Once the patch or simulselect operation is ACTIVE, the database is no longer needed and is available for another PSS operation.

An example NIM PSS database includes the following entries: state, timer, next, header, unit IDs, group IDs, con IDs, TL IDs, index, and ID lists. The "state" entry corresponds to either an activation or deactivation state for the patch/simulselect operation. "Timer" refers to a current state time, and "next" corresponds to a pointer for the next entry on the patch entity list. "Header" corresponds to the PSS header message, and the four "ID" entries correspond to counts of stored radio IDs, group IDs, conventional channels, and phone numbers, respectively. The "index" provides access to the next ID, and the "ID list" identifies extended network enabled entities.

Figure 7A:
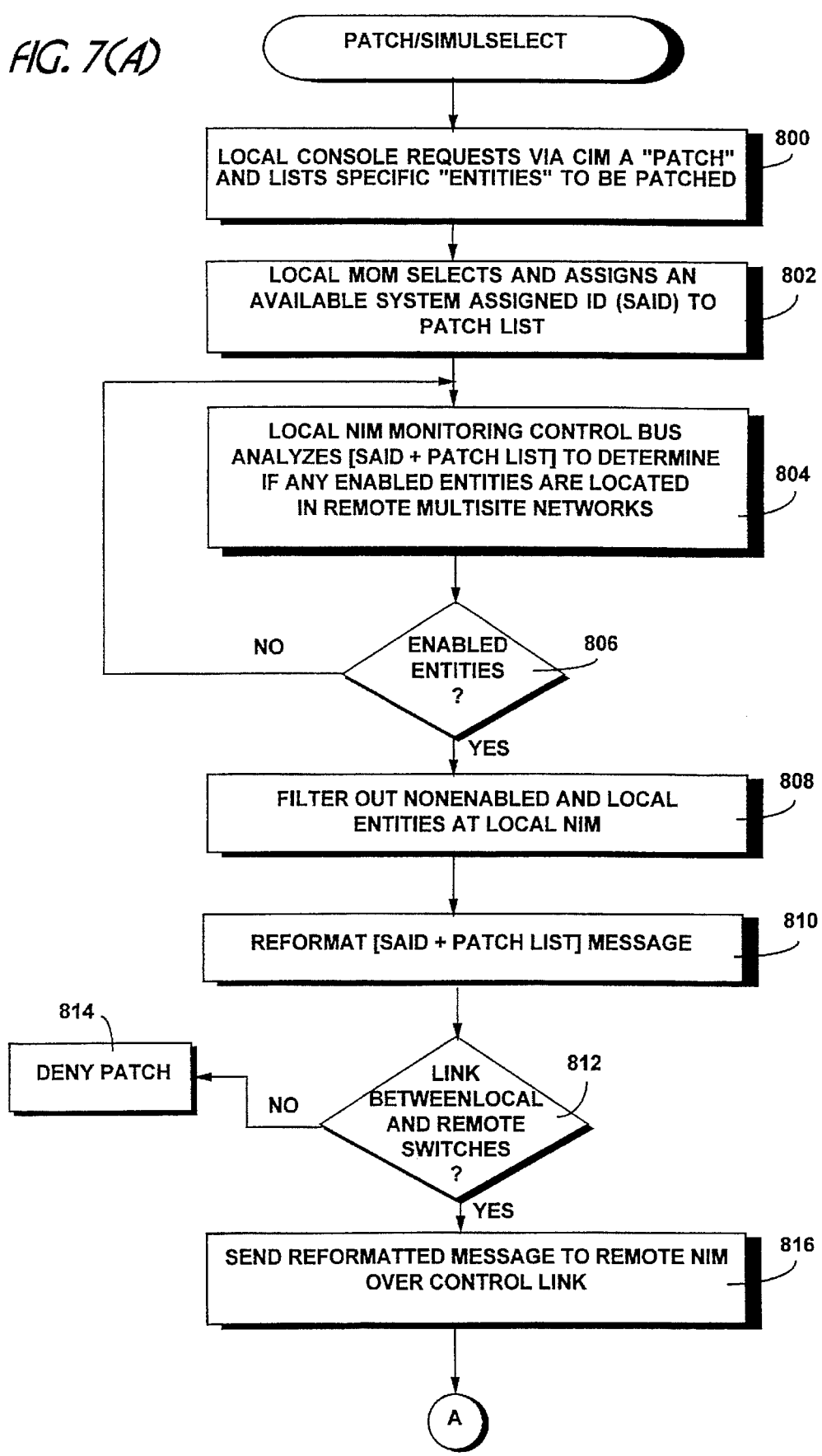
FIGS. 7A and 7B are a flow chart which illustrate the procedures for setting up a patch/simulselect function in the extended multisite network in accordance with the present invention.
Figure 7B:
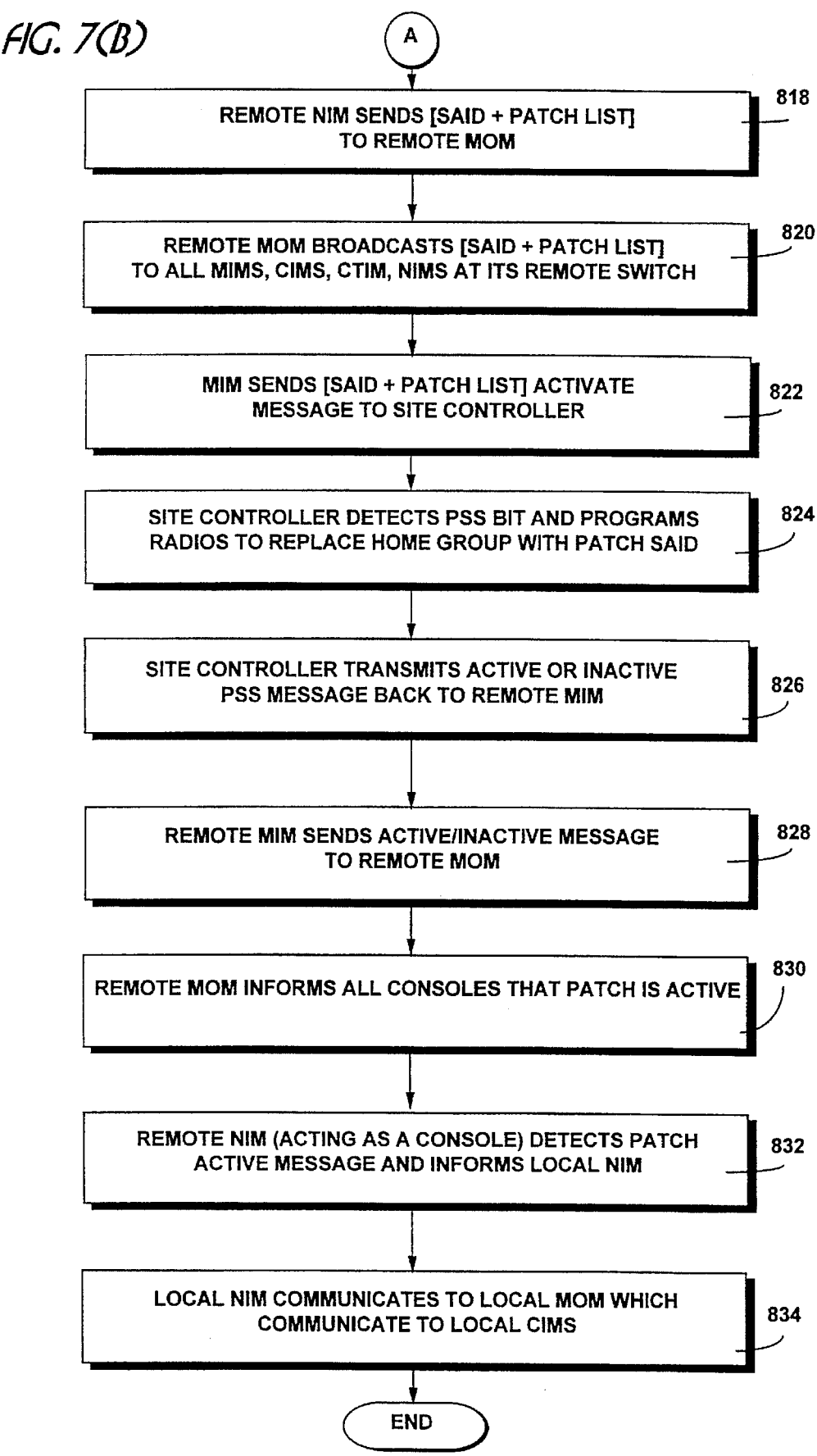

The overall patch/simulselect activation operation is now described in conjunction with the flow chart illustrated in FIGS. 7A and 7B. Initially, a local console initiates, via its corresponding console interface module (CIM) and the multisite control bus, a console "patch" operation, with the operator creating a list of specific entities to be patched. As described above, those entities each have a corresponding ID and may include one or more of (1) individual radio units, (2) radio groups, (3) conventional radio channels, (4) wireline telephone numbers, etc. (step 800). The local MOM selects and assigns an available SAID to this patch list (step 802).

A local NIM connected to and monitoring the local multiswitch control bus analyzes the patch list and determines if there are any entities on that list enabled for remote multisite system (step 804). If there are no remote enabled entities, control returns to step 804; otherwise, control proceeds to block 808 where nonenabled remote entities and local entities are filtered/removed from the NIMs patch list.

The NIM then reformats the assigned SAID and filtered patch list (block 810) and determines whether or not a control link between the local and remote NIMs is available (block 812). If not, the patch is denied (block 814). If the control link is available, a PSS ACTIVATE message is sent to the remote NIM over the control link (block 816) with the remote NIM sending that message onto the remote MOM (block 818). The remote MOM broadcasts the PSS ACTIVATE message which includes the SAID and patch list to all remote MIMs, CIMs, CTIM, and NIM(s) at that remote multisite system (block 812). Each one of these modules then sends an appropriate patch ACTIVE message.

The flow chart in FIG. 7B illustrates the specific example of remote enabled radio entities to be included in the patch. Specifically, a remote MIM sends the patch ACTIVATE message to its corresponding site controller (block 822). The site controller programs radios within its site corresponding to the IDs on the patch list to replace their home group ID with the patch SAID (block 824).

The site controller then transmits an ACTIVE or an INACTIVE PSS message back to the remote MIM (block 826). The remote MIM sends the ACTIVE/INACTIVE message to the remote MOM (block 828), and the remote MOM informs all consoles that the patch is ACTIVE (block 830). The remote NIM (which is acting as a console with respect to all other interface modules on the remote multisite switch), detects the patch ACTIVE/INACTIVE message and it sends that message to the local NIM over the control link (block 832). The local NIM then communicates via the local MOM to the local CIM that the patch is established or not established (block 834).

Figure 8:
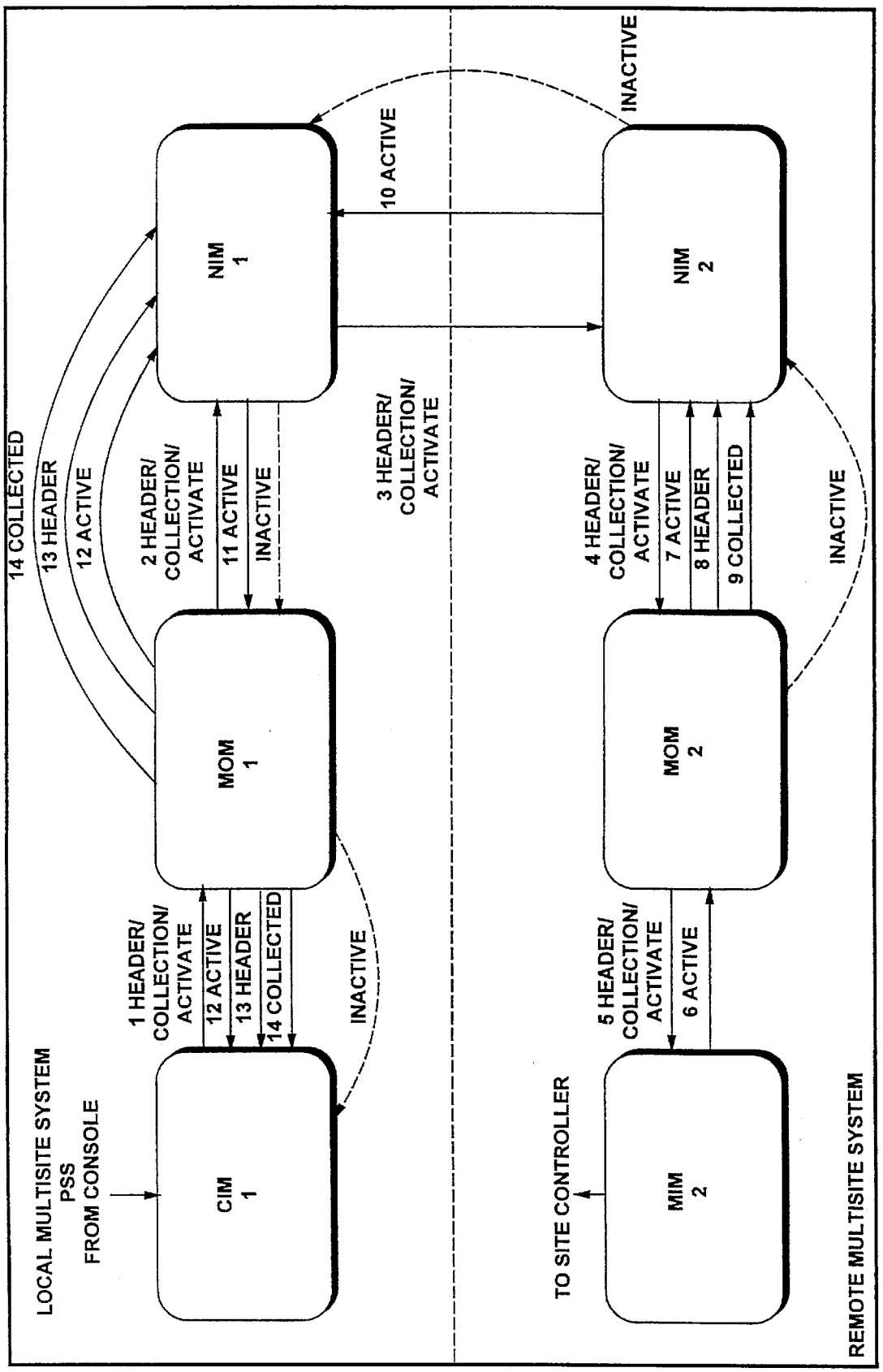
FIG. 8 is a flow diagram illustrating the data flows involved in activating/deactivating a patch/simulselect operation in accordance with the present invention.

FIG. 8 is a flow diagram illustrating an example of extended multisite patch/simulselect messages transferred between local and remote multisite systems. In particular, FIG. 8 illustrates various message exchanges (in a sequence from 1–14) between interface processors connected to the local and remote multisite switches which are involved in the patch setup.

Since the local NIM receives messages destined for all NIMs and for all CIMs, the local NIM receives multiple copies of some PSS messages. In order for the NIM to keep track of the state of a PSS activation/deactivation, the NIM PSS instructions are formatted as a state machine. As a result, the NIM is able to determine the function of a message based on the current state for a corresponding SAID. Using this state machine approach, the NIM performs error checking by maintaining a state timer for each state. If the state timer expires, the NIM generates a deactive message for the SAID.

Figure 9:
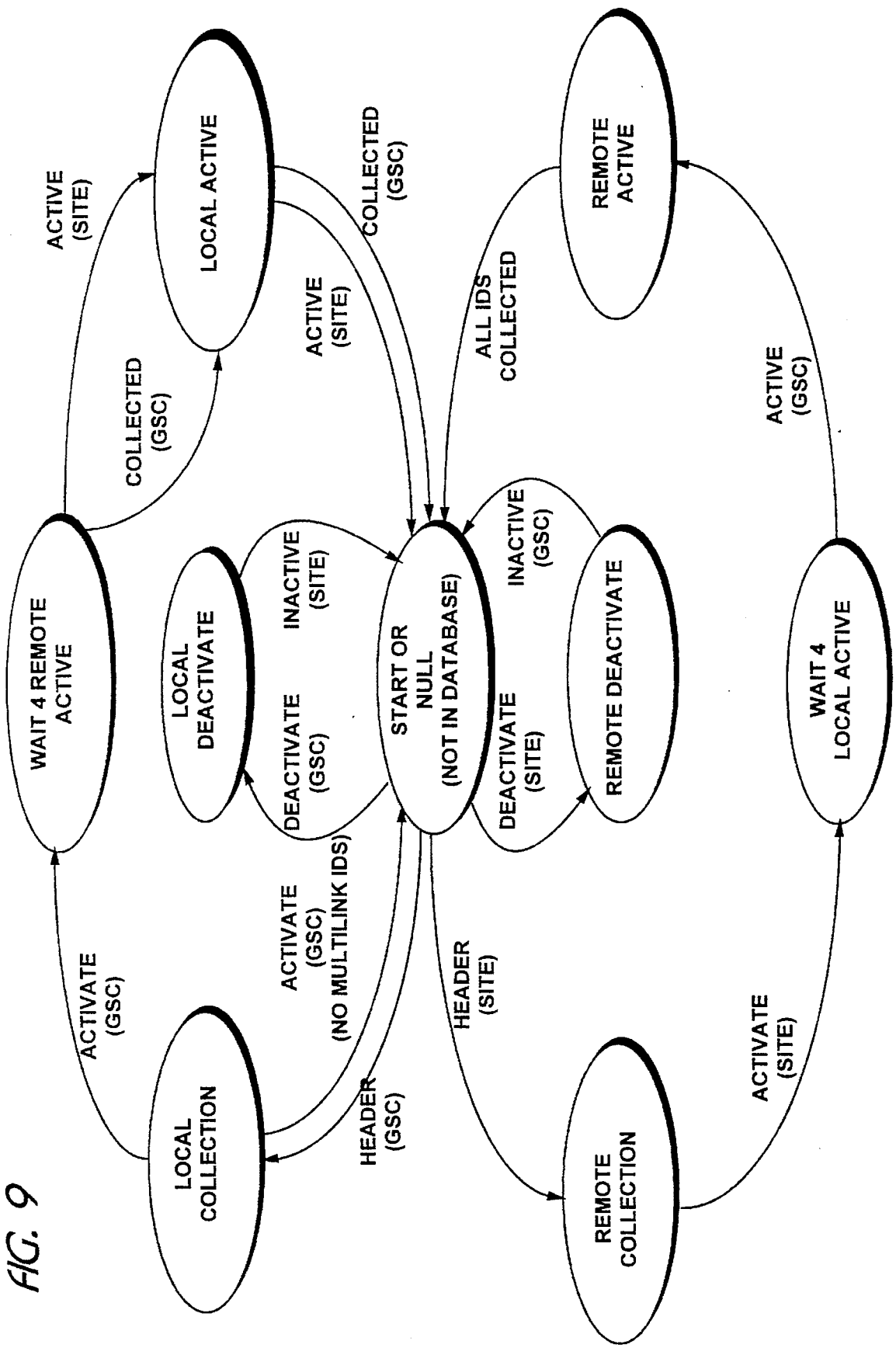
FIG. 9 is a diagram indicating state changes/procedures followed by each NIM in the extended multisite network regarding patch/simulselect operations.

FIG. 9 illustrates a NIM PSS state diagram. The start or null state is the initial starting point as well as an ending point of the state diagram. A NIM only tracks patch/simulselect states during activation and deactivation. Once a patch/simulselect is activated, the SAID is tracked just like any other radio talk group; no extra database entries are necessary. The states shown in the top half of FIG. 9 relate to the local NIM states. Patch/simulselect activation/deactivation messages come from the local multisite control bus and must be routed to a remote multisite node. The local collection state corresponds to receipt of a patch/simulselect activation message from the local control bus, i.e., from a local console or another local NIM. The wait for remote active state corresponds to the situation where a patch/simulselect activation message has been sent to a remote node with the local NIM waiting for an active message from the remote NIM (see the ACTIVE message 10 in FIG. 8). Local active corresponds to a state where the local NIM waits to receive the collected message from the local MOM (see the collected message 14 in FIG. 8). In the local deactivate state, the patch simulselect deactivation message is received from the local control bus and sent to the remote node waiting for indication that the patch/simulselect has been deactivated on the remote node.

The states shown in the bottom half of FIG. 9 relate to remote NIM states. In this case, the patch/simulselect activation/deactivation messages come from remote nodes over the external control link and require routing to the local multisite node. Remote collection corresponds to receipt of the HEADER at the remote NIM node (see instruction 3 in FIG. 8). Wait for local active corresponds to the remote NIM waiting for the ACTIVE message from the local node (message 10 in FIG. 8). When received, the message indicates that at least one site/NIM has responded to the patch simulselect activation at the local node. The ACTIVE message is sent back to the originating node. Remote active corresponds to the remote MOM receiving the ACTIVE message (message 6 in FIG. 8) from the remote NIM. When the PSS activation is complete, the database entry is deleted and control returns to the NULL state. The remote deactivate state indicates that the DEACTIVATE message has been received from a remote NIM and was sent to the remote MOM. The remote NIM then waits for an indication from the remote MOM that the patch/simulselect deactivation is complete.

Console Tracking in an Extended Multisite Network

The present invention also provides for the creation and maintenance of a distributed data base of console programmed entities in an extended multisite network. The NIMs use database information to route any calls, in particular radio calls, to any console that must receive a call because that console is monitoring a particular callee, (i.e., the console has the callee programmed). This monitoring task is particularly significant since each console may monitor more than one hundred callees at one time. Moreover, each multisite system may include multiple consoles with several of those consoles having similar callees programmed. Thus, keeping track of console programming in each multisite system and appropriately routing calls to the necessary multisite so that they are then routed to the appropriate console(s) is a significant task.

In general, each local NIM maintains a console tracking database that includes: a count of how many local consoles in the local multisite have a particular callee/entity programmed; a list of entities currently programmed at each local console; and a remote programmed flag/bit for each entity indicating whether that entity is programmed at any remote console. If the extended network includes stargate NIMs, the NIM database also includes: a count of NIMs on the same multisite system that have the callee entity programmed remotely, (i.e., have their remote program flag set); and a list of NIMs that have the callee entity remotely programmed, (i.e., NIM 1, NIM 2, . . . ). The NIM then uses that programmed entity information to route extended network calls to remote multisite switches that have that callee programmed at one or more consoles. When a console logs out or is reset, the programmed counts for that console are decremented and the callees are removed from the list. Moreover, when individual entities are modified at a particular console (add/delete/modify), the consoles, CIM broadcasts a message on the multisite control bus to update the console programmed entity data base in the local NIM. The NIM also uses the remote programmed flag in its database for radio talk groups and conventional channels to indicate that that entity is programmed at a remote node and must have calls routed to it over the local NIM.

Figure 10A:
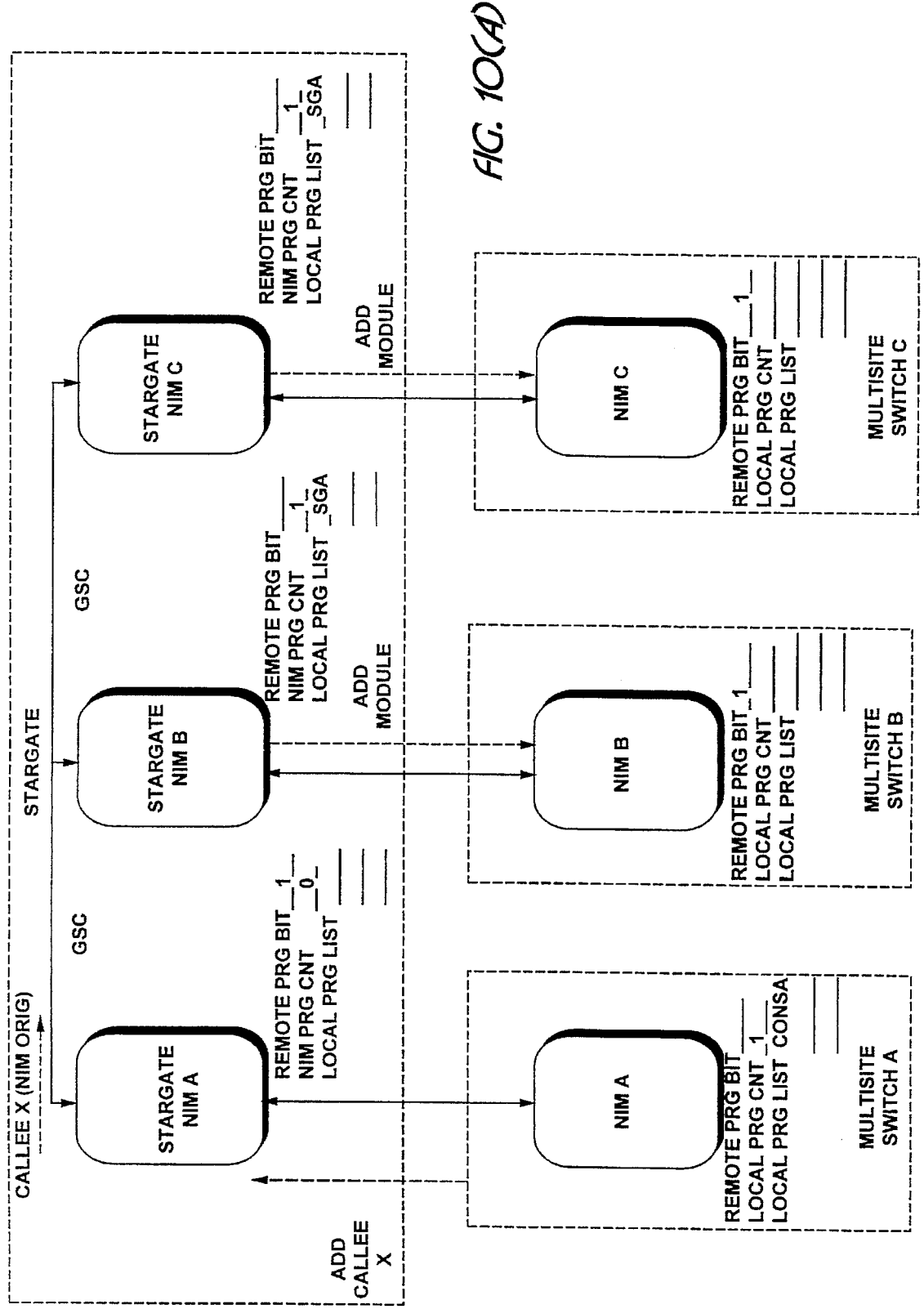
FIGS. 10A–10C are diagrams illustrating examples of console tracking in an extended multisite network in accordance with the present invention.
Figure 10B:
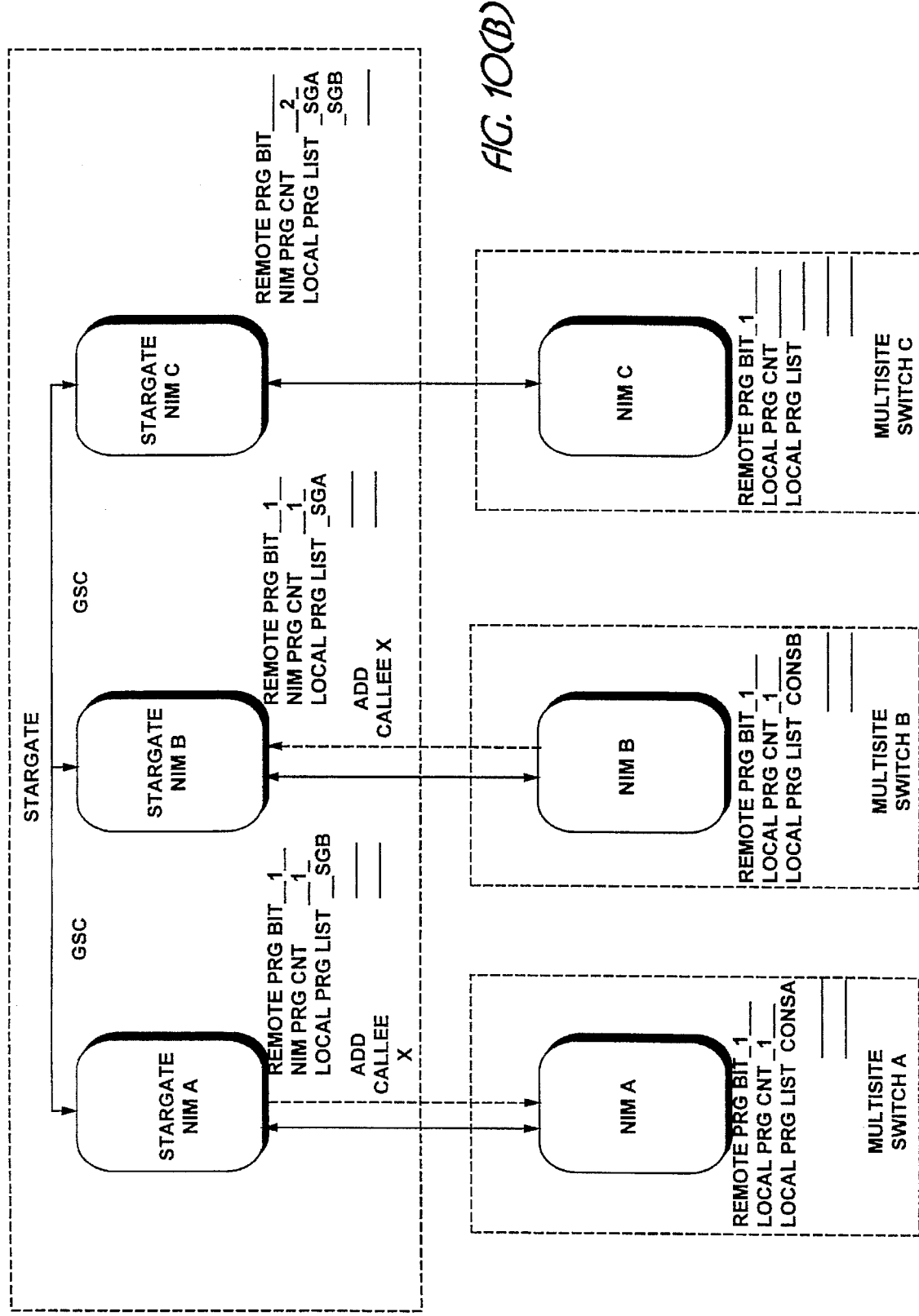
Figure 10C:
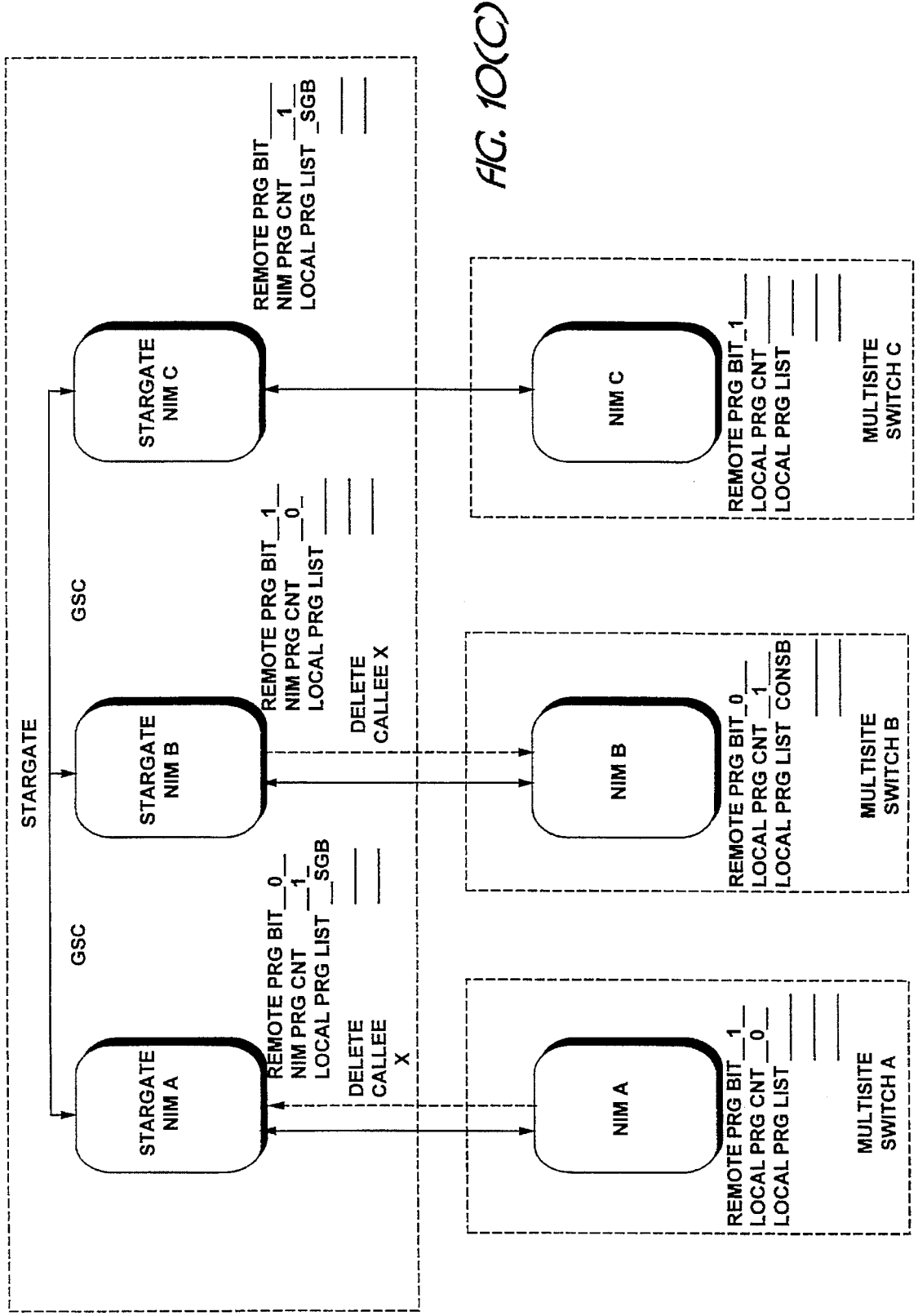

FIGS. 10A–10C describe through an example the console tracking procedure for plural multisite systems connected in a stargate system arrangement. As described above, in a stargate arrangement, more than two multisite switch networks are linked together by a central multisite switch network that contains multiple stargate NIMs. For ease of description, each NIM is referred to generically as a node. Three multisite switches A, B, and C are connected via corresponding NIM A, NIM B, and NIM C to a stargate network having stargate NIMs A, B, and C connected by a (GSC) control bus. For this example, only control communications are indicated. The database entries in FIGS. 10A–10C are for a callee X which could be an individual radio ID, a talk group ID, a conventional radio ID, etc.

Initially, callee X is programmed to be monitored by a console in multisite switch A. As a result of that console programming callee X, local NIM A sends an "add callee" update message to stargate NIM A which then passes that message onto other NIMs. The console tracking data base in local NIM A increments its local program count to one and lists in its local console list console A for this particular callee X. Stargate NIM A then sets its remote program flag bit in its database and sends the add callee message to the other stargate NIM C. The stargate NIMs include a NIM program count entry similar to the local program count entry kept by each local NIM. The NIM program count indicates that for this particular callee X, at least one stargate NIM requires calls to be routed over the stargate network, i.e., another stargate NIM has its remote programmed flag set. Both stargate NIMs B and C therefore increment their NIM program count by one and add stargate NIM A to their NIM program list.

As shown in FIG. 10B, callee X is then also programmed at a console on multisite system B. Accordingly, the local program count entry in the local NIM B database is incremented for callee X and that particular console in multisite system B is added to the local console list for that callee X. NIM B then sends an add callee X message to stargate NIM B which sets its remote program flag and transmits the message onto the stargate control bus. Stargate NIM A adds stargate NIM B to its NIM program list, and the add callee X message is forwarded to NIM A to set the remote program bit for callee X. Stargate NIM C increments its NIM program count to two since both stargate NIMs A and B have requested that calls involving callee X be routed to them, and both stargate NIM A and stargate NIM B are included in its NIM program list.

At this point, the remote program bits cause a call to callee X on multisite A to be routed both to console A in multisite switch A and also to the stargate NIM A and then via stargate NIM B, to NIM B in multisite B, and finally to console B. Similarly, a call involving callee X at multisite system B will be routed to console B, to the stargate, and then to multisite A via stargate NIM A and NIM A. Finally, a call involving callee X on multisite C will be routed to the stargate and then through stargate NIMs A and B to multisite sites A and B to permit console A and console B to monitor that call. Once the call involving callee X is received at each local NIM, the local NIM broadcasts that call on the local control bus. The CIMs monitor the local control bus and route programmed calls to their corresponding consoles.

FIG. 10C illustrates a "deprogramming" of callee X at console A at multisite system A. A delete callee X message is sent to the stargate by NIM A. In the database at NIM A, the local program count is decremented and console A is removed from the local program list. Since the count is now zero, a delete module command is sent to Stargate NIM A. Stargate NIM A then resets its remote programming, and at stargate NIMs B and C, the NIM program count is decremented by one and stargate NIM A is deleted from the local program list. Accordingly, calls involving callee X at either multisite A or multisite C will be routed to multisite B via stargate NIM B and local NIM B. However, calls involving callee X at multisite B will not be routed to the stargate and therefore not to multisites A and C.

Thus, when a callee is programmed at a console on a remote node, it appears as a remotely programmed callee on the local NIM. The console tracking data in a NIM database keeps track of these remotely programmed callees in the same manner as console program callees. In fact, to the local multisite system, a callee programmed at a console's CIM and a callee remotely programmed at a NIM are treated the same to the extent that calls to that callee are routed to the console and remote node.

Figure 11:
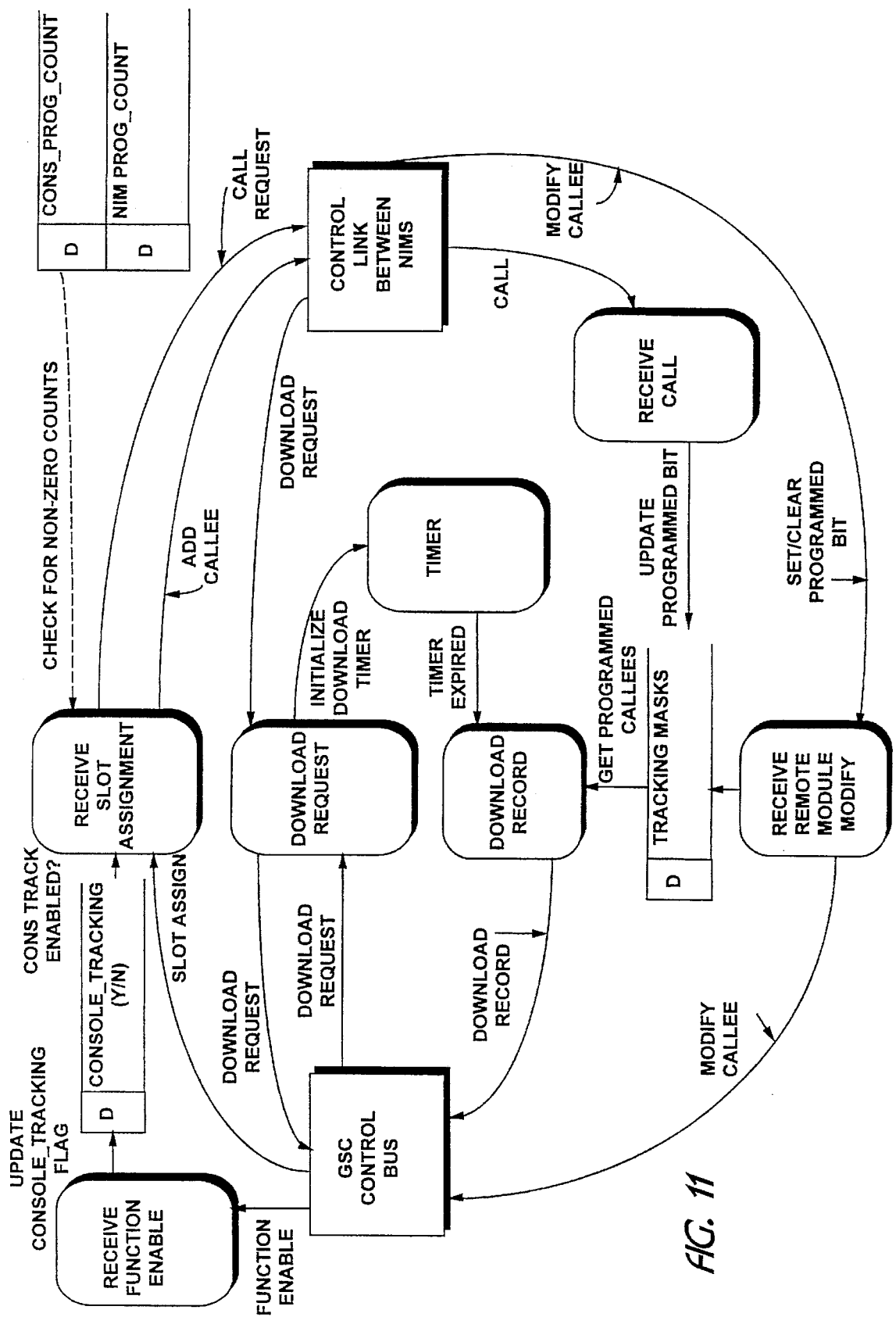
FIG. 11 is a flow diagram illustrating the procedures followed by each NIM in an extended multisite network in addition to "common" console tracking procedures.

FIG. 11 is a data flow diagram followed by a NIM in performing various console tracking features. The NIM uses the console tracking data base to maintain remotely programmed data (bits) in the tracking databases of other NIMs. The NIM also follows procedures to download its own remotely programmed console tracking data on request and to continually update the remotely programmed console tracking data. Using these procedures, the present invention is able to monitor literally thousands of callees programmed at various different consoles in multiple multisite systems over an extended multisite network.

Thus, the present invention provides a dispatcher with the ability to perform basic and advanced console dispatch functions in an extended multisite network in essentially the same fashion that those console functions are performed in a single multisite radio communications system. Using a unique console tracking technique, the present invention is able to monitor literally thousands of callee's programmed at various different consoles over the extended multisite network and ensure that calls are properly routed to those consoles in an efficient, effective manner that is transparent to the console operator.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. An extended radio communications network comprising:

plural multisite radio communications systems interconnected by network interface modules, and one or more dispatch consoles at each of the multisite systems, wherein one or more console operations initiated at one dispatch console at one of the multisite systems is effected over the entire extended network, the console operations including tracking consoles at each of the multisite systems that are programmed to monitor a particular callee so that a call involving the particular callee is routed over the extended network to each of the programmed consoles to permit monitoring of the call by dispatch operators at the programmed consoles.

2. The extended network in claim 1, wherein each multisite system includes:

a time division multiplex (TDM) bus for conveying digital audio information during preassigned time slots to interface modules connected to said TDM bus;

a control bus for conveying operational control message information to interface modules connected to said control bus; and dedicated interface modules for interfacing communications between said TDM bus and radio communication units wherein the network interface modules transfer and receive both TDM audio bus information and control message bus information to/from other multisite systems.

3. The extended network in claim 2, wherein the console operations include tracking in the network interface module in each multisite network which consoles are programmed to monitor a particular callee such that the network interface module monitors the control bus, determines if a particular call involves a callee programmed at a remote network interface module, and routes that particular call involving the particular callee to consoles at a different multisite system.

4. The extended network in claim 1, wherein each multisite system maintains a database storing a count of how many consoles are programmed to monitor a particular callee for each callee in the extended network, a list of the those consoles in the multisite system, and a flag indicating whether the particular callee is programmed at any console or another multisite system.

5. The extended network in claim 4, wherein the callee count is incremented or decremented each time a console in the multisite system programs or deprograms the callee at a console.

6. An extended radio communications network comprising:

plural multisite radio communications systems interconnected by network interface modules, and one or more dispatch consoles at each of the multisite systems, wherein one or more console operations initiated at one dispatch console at one of the multisite systems is effected over the entire extended network, wherein the one or more console operations include setting up at a console in a local multisite system a temporary group involving callees at a local and a remote multisite system.

7. The extended network in claim 6, wherein the temporary group is a patch which permits a dispatch operator at the console and the callees to communicate with each other.

8. The extended network in claim 6, wherein the temporary group permits a dispatch operator at the console to transmit information to the callees.

9. The extended network in claim 6, wherein the temporary group includes one or more of the group including: radio units, radio talk groups, conventional radio channels, and wireline telephone numbers.

10. In a multisite trunked radio frequency communications network including plural digital repeater sites having corresponding coverage areas and serving mobile or portable trunked radio transceivers disposed within the coverage areas, a local multisite switch for routing communications between digital repeater sites and other communication sources/destinations within the network, comprising:

one or more local dispatch consoles connected to the local multisite switch, and a local network interface module for transferring and receiving communications to/from another remote multisite network, wherein console dispatch operations initiated at the one or more dispatch consoles in the local multisite switch are executed at the local multisite switch and at the remote multisite switch through the local network interface module, and wherein the local network interface module maintains console tracking information regarding whether consoles at the local and the remote multisite switches are programmed to monitor communications involving a radio transceiver, a group of radio transceivers, or a radio channel.

11. In a multisite trunked radio frequency communications network including plural digital repeater sites having corresponding coverage areas and serving mobile or portable trunked radio transceivers disposed within the coverage areas, a local multisite switch for routing communications between digital repeater sites and other communication sources/destinations within the network, comprising:

one or more local dispatch consoles connected to the local multisite switch, and a local network interface module for transferring and receiving communications to/from another remote multisite network, wherein console dispatch operations initiated at the one or more dispatch consoles in the local multisite switch are executed at the local multisite switch and at the remote multisite switch through the local network interface module, wherein an operator at a local dispatch console initiates and establishes a temporary radio communication involving a first group of radio transceivers located in a coverage area for the local multisite switch and a second group of radio transceivers located in a coverage area for one or more of the remote multisite switches to temporarily permit the first group and second group of radio transceivers to communicate.

12. The multisite network in claim 11, wherein the local network interface module processes requests for temporary radio communications involving a remote group of radio transceivers enabled to participate in temporary radio communications over the network.

13. In an extended multisite network that permits intercommunication between a plurality of otherwise independent, multisite trunked radio communications systems, each independent, multisite trunked radio communications system including one or more radio communication units, a switching arrangement for routing communications between digital repeater sites and one or more dispatch consoles, a method comprising the steps of:

tracking for a plurality of dispatch consoles at different ones of the independent, multisite trunked radio communications systems in the extended multisite network which dispatch consoles are programmed to monitor communications involving particular call entities, and routing a communication involving a particular call entity from a local multisite trunked radio communications system over the extended multisite network to a console on a remote independent, multisite trunked radio communications system programmed to monitor communications involving said particular call entity.

14. The method in claim 1, wherein said switching arrangement includes a digitized-audio signal bus, a digital control message communications link, and one or more dedicated network interface modules connected to said digitized-audio signal bus and wherein the call is routed over the extended multisite network through the one or more dedicated network interface modules.

15. In an extended multisite network that permits intercommunication between a plurality of otherwise independent, multisite trunked radio communications systems, each independent, multisite trunked radio communications system including one or more communication units, a switching arrangement for routing communications between digital repeater sites and one or more dispatch consoles within said independent, multisite trunked radio communications system, a method comprising the steps of:

selecting at a console in one of the plurality of independent, multisite trunked radio communications systems a list of communicating entities at local and remote multisite trunked radio communications systems;

generating a temporary talk group from the list of communicating entities;

determining which entities at the remote multisite system are enabled for remote console operations; and sending a list of only enabled entities to the remote multisite system.

16. The method in claim 15, further comprising:

assigning system identifications to the temporary talk group, each multisite system having a group of available identifications.

17. An extended multisite network that permits intercommunication between a plurality of otherwise independent, multisite trunked radio communications systems, each independent, multisite trunked radio communications system including one or more communication units, a switching arrangement for routing communications between digital repeater sites, one or more dispatch consoles within said independent, multisite trunked radio communications system, and a console tracking database for monitoring which consoles in the extended multisite network are programmed to monitor communications involving a particular callee.

18. The extended multisite network in claim 17, wherein the console tracking database in a local multisite trunked radio communications system includes information regarding whether a console located at a remote multisite trunked radio communications system is programmed to monitor communications involving the particular callee.

19. In an extended multisite network that permits intercommunication between a plurality of otherwise independent, multisite trunked radio communications systems, each independent, multisite trunked radio communications system including one or more communication units, a switching arrangement for routing communications between digital repeater sites, one or more dispatch consoles within said independent, multisite trunked radio communications system, a method of providing console dispatch communications to remote entities located over the extended multisite network, wherein an operator at a dispatch console located in a first multisite trunked radio communication system sets up a temporary group communication between the dispatch console, a first group of radios in the first multisite system only enabled to conduct group communications within the first multisite system, and one or more remote entities located in a second multisite trunked radio communication system.

20. The extended multisite network in claim 19, the method further comprising:

determining which entities at the remote multisite system are enabled for remote console operations, and sending a list of only enabled entities to the remote multisite system.

21. The extended multisite network in claim 19, the method further comprising:

assigning system identifications to the temporary group communication, each multisite system having a group of available identifications.

* * * * *